United States Patent
Otsuka et al.

(10) Patent No.: US 8,351,734 B2
(45) Date of Patent: Jan. 8, 2013

(54) VIDEO SIGNAL PROCESSING DEVICE AND VIDEO DISPLAY DEVICE

(75) Inventors: Koji Otsuka, Osaka (JP); Osamu Manba, Osaka (JP); Yasufumi Hagiwara, Osaka (JP); Daisuke Koyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/054,003

(22) PCT Filed: Jul. 9, 2009

(86) PCT No.: PCT/JP2009/062512
§ 371 (c)(1),
(2), (4) Date: Jan. 13, 2011

(87) PCT Pub. No.: WO2010/007933
PCT Pub. Date: Jan. 21, 2010

(65) Prior Publication Data
US 2011/0115982 A1 May 19, 2011

(30) Foreign Application Priority Data
Jul. 14, 2008 (JP) .................................. 2008-182724

(51) Int. Cl.
*G06K 9/40* (2006.01)
(52) U.S. Cl. ........ 382/266; 382/254; 382/260; 382/263; 382/199; 382/200
(58) Field of Classification Search .................. 382/254, 382/266, 260, 263, 199, 200
See application file for complete search history.

(56) References Cited

U.S. PATENT DOCUMENTS

| | | | | |
|---|---|---|---|---|
| 5,144,686 | A | * | 9/1992 | Takashi et al. ............... 382/263 |
| 5,715,015 | A | * | 2/1998 | Lee ................................ 348/629 |
| 7,545,976 | B2 | * | 6/2009 | Gondek et al. ................ 382/162 |
| 7,570,832 | B2 | * | 8/2009 | Chui et al. ..................... 382/260 |
| 2003/0086623 | A1 | * | 5/2003 | Berkner et al. ............... 382/260 |
| 2004/0036923 | A1 | | 2/2004 | Kokemohr et al. |
| 2008/0031538 | A1 | | 2/2008 | Jiang et al. |
| 2008/0267525 | A1 | * | 10/2008 | Dai et al. ...................... 382/266 |
| 2009/0161972 | A1 | * | 6/2009 | Sekiguchi et al. ............ 382/233 |

FOREIGN PATENT DOCUMENTS
EP 0 443 486 A2 8/1991
(Continued)

OTHER PUBLICATIONS
Supplementary European Search Report issued in European Patent Application No. 09797858.9 on May 29, 2012.

*Primary Examiner* — Ali Bayat
(74) *Attorney, Agent, or Firm* — Birch, Stewart, Kolasch & Birch, LLP

(57) ABSTRACT

In an X-Y conversion chart, a threshold Th is defined as Y=0, that is, defined on the X axis, a range from −Th to +Th is defined as a range in which smoothing processing is performed, and a range outside −Th to +Th is defined as a range in which sharpening processing is performed. Among equations denoted by Y1 and Y2 expressed by two linear straight lines, intersections of both the equations Y1 and Y2 are set to the maximum value and the minimum value of an X-Y conversion equation in this case. The threshold is expressed by an intersection of Y2 and the X axis. This algorithm is formed by three factors of: a coefficient α indicating the strength of smoothing; a coefficient β indicating the strength of sharpening; and a threshold Th on the X axis for determining switching between the smoothing processing and the sharpening processing.

8 Claims, 38 Drawing Sheets

FOREIGN PATENT DOCUMENTS

| | | |
|---|---|---|
| EP | 0 700 216 A1 | 3/1996 |
| JP | 3-245675 A | 11/1991 |
| JP | 9-121366 A | 5/1997 |
| JP | 2008-78830 A | 4/2008 |
| JP | 2008-113337 A | 5/2008 |

\* cited by examiner

Sharpening processing algorithm unsharp mask (USM)

One configuration of peripheral circuits of spacial filter

Case where only α is changed to be larger

Case where only β is changed to be smaller

FIG. 8

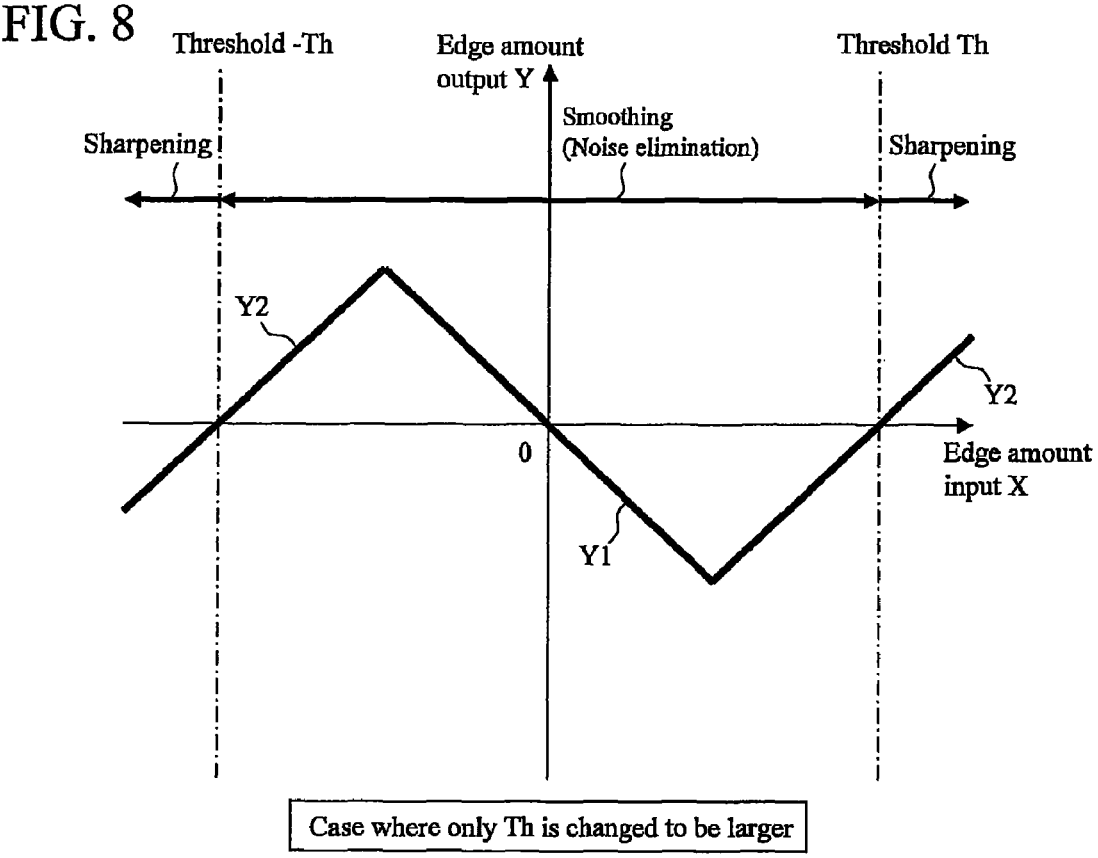

Case where only Th is changed to be larger

FIG. 9 (a)

$Y1 = \alpha \cdot X$   $\cdots$ Equation 1-1

$Y2 = \beta \cdot (X - Th\_t)$   $\cdots$ Equation 1-2 in the proviso that $$Th\_t = \begin{cases} Th & (X \geq 0) \\ -Th & (X < 0) \end{cases}$$   $\cdots$ Equation 1-3

$$Y = \begin{cases} \max(Y1, Y2) & (X \geq 0) \\ \min(Y1, Y2) & (X < 0) \end{cases}$$   $\cdots$ Equation 1-4 in the proviso that $$\max(a, b) = \begin{cases} a & (a \geq b) \\ b & (a < b) \end{cases}$$

$$\min(a, b) = \begin{cases} a & (a < b) \\ b & (a \geq b) \end{cases}$$

One configuration example of display device

FIG. 16
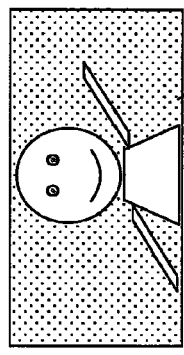
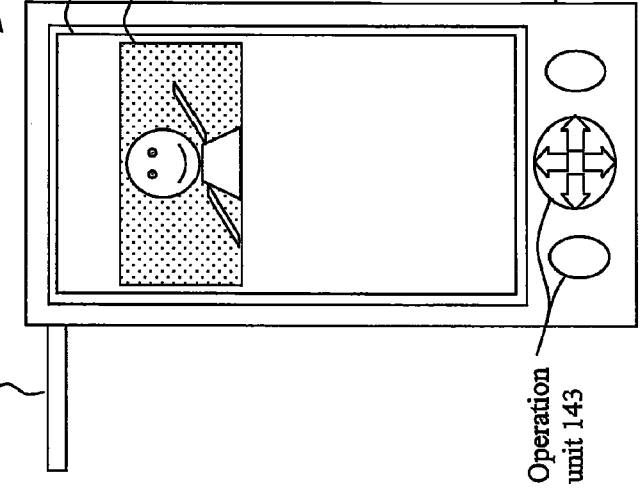
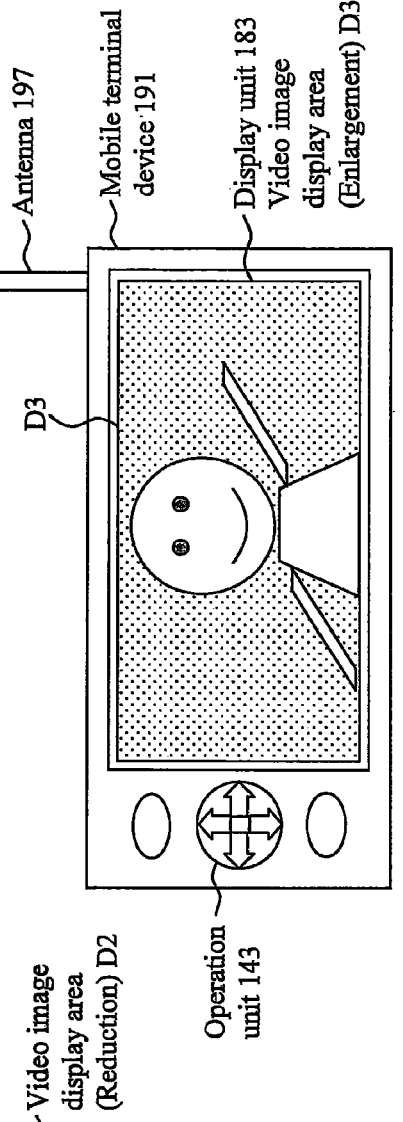

FIG. 18

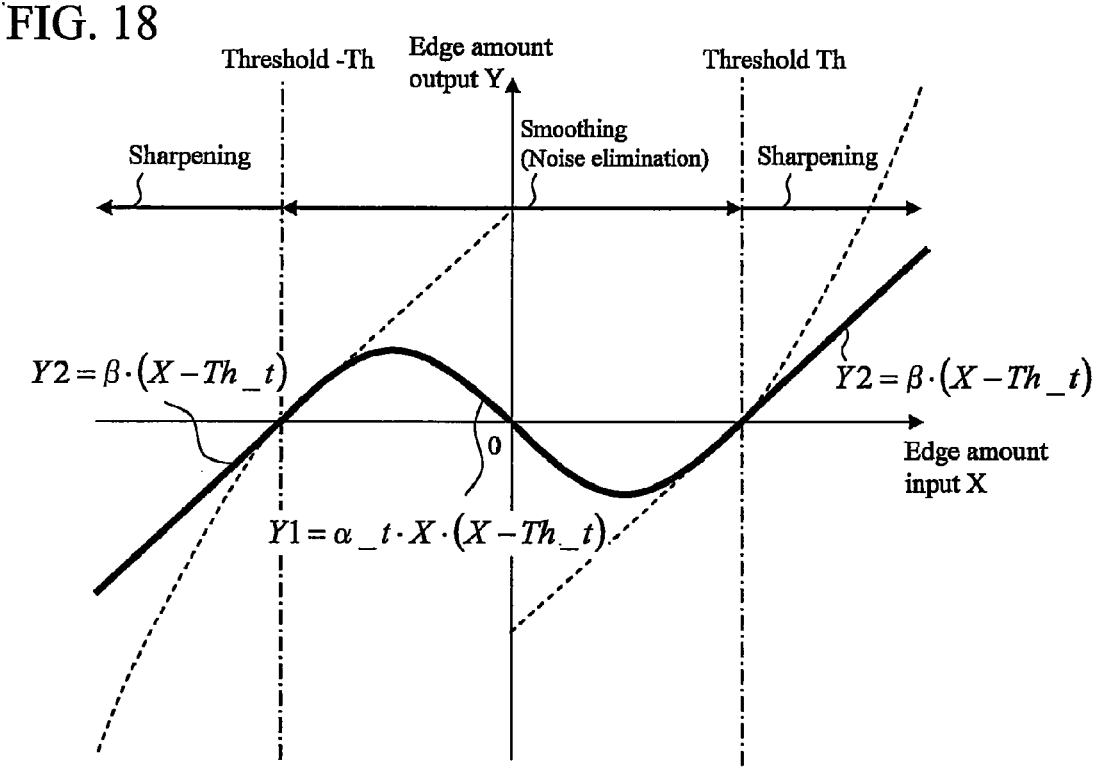

FIG. 19 (a)

$$Y1 = \alpha\_t \cdot X \cdot (X - Th\_t) \quad \cdots \text{Equation 2-1}$$

$$Y2 = \beta \cdot (X - Th\_t) \quad \cdots \text{Equation 2-2}$$

in the proviso that $$\alpha\_t = \begin{cases} \alpha & (X \geq 0) \\ -\alpha & (X < 0) \end{cases}$$

$$Th\_t = \begin{cases} Th & (X \geq 0) \\ -Th & (X < 0) \end{cases} \quad \cdots \text{Equation 2-3}$$

$$Y = \begin{cases} \max(Y1, Y2) & (0 \leq X < Th \ or \ X < -Th) \\ \min(Y1, Y2) & (-Th \leq X < 0 \ or \ X \geq Th) \end{cases} \quad \cdots \text{Equation 2-4}$$

in the proviso that $$\max(a, b) = \begin{cases} a & (a \geq b) \\ b & (a < b) \end{cases}$$

$$\min(a, b) = \begin{cases} a & (a < b) \\ b & (a \geq b) \end{cases}$$

FIG. 21

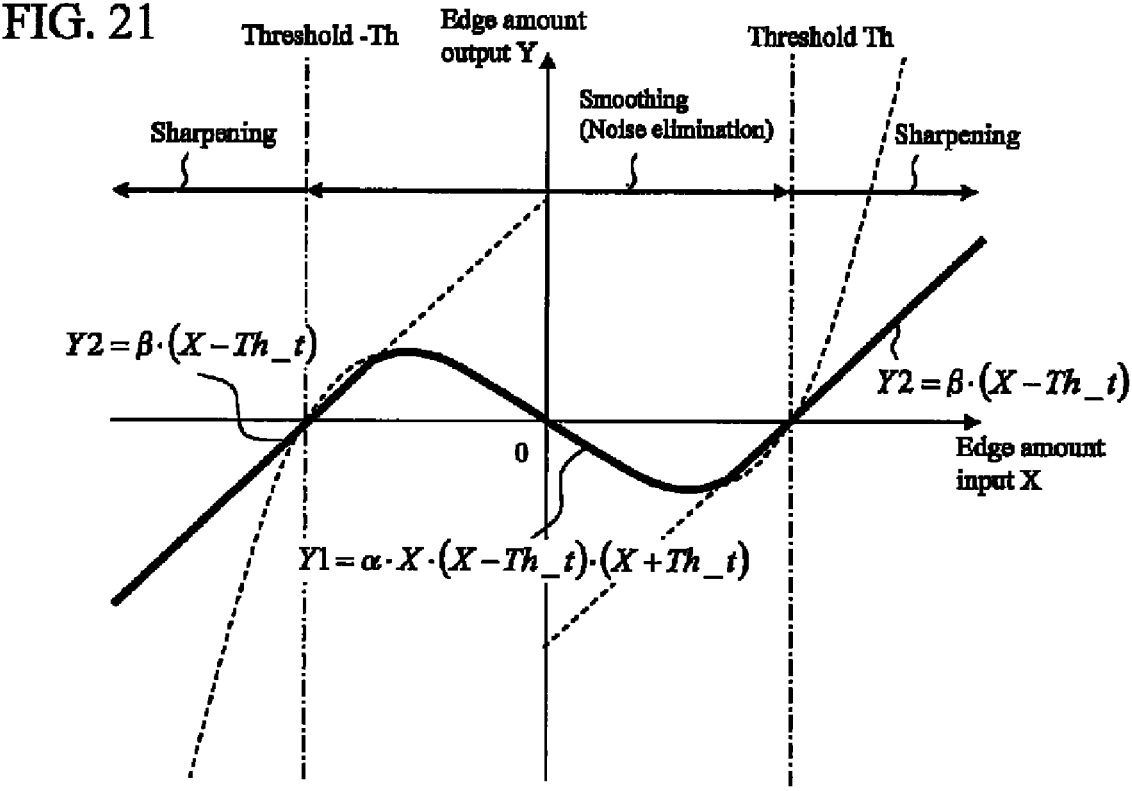

FIG. 22 (a)

$Y1 = \alpha \cdot X \cdot (X - Th\_t) \cdot (X + Th\_t)$  ··· Equation 3-1

$Y2 = \beta \cdot (X - Th\_t)$  ··· Equation 3-2 in the proviso that $$Th\_t = \begin{cases} Th & (X \geq 0) \\ -Th & (X < 0) \end{cases}$$  ··· Equation 3-3

$$Y = \begin{cases} \max(Y1, Y2) & (0 \leq X < Th \text{ or } X < -Th) \\ \min(Y1, Y2) & (-Th \leq X < 0 \text{ or } X \geq Th) \end{cases}$$  ··· Equation 3-4 in the proviso that $$\max(a,b) = \begin{cases} a & (a \geq b) \\ b & (a < b) \end{cases}$$

$$\min(a,b) = \begin{cases} a & (a < b) \\ b & (a \geq b) \end{cases}$$

FIG. 24
(a)
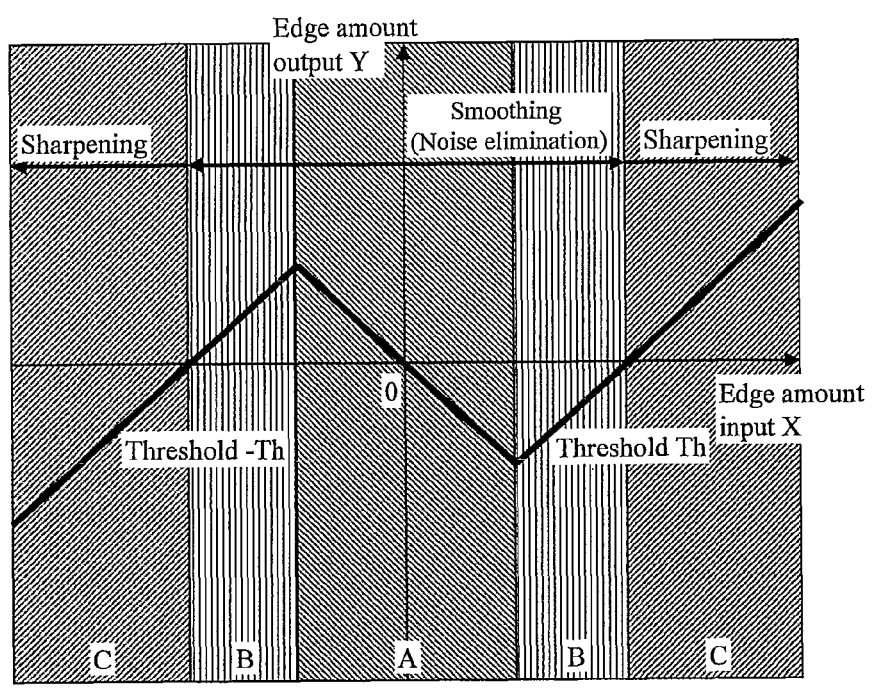
(b)
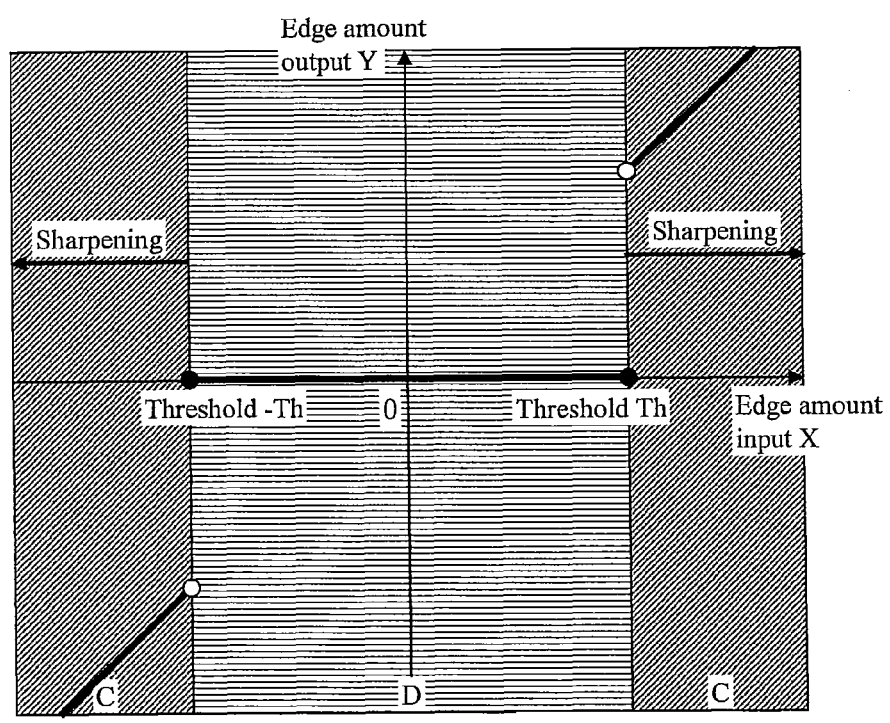
A: Target data for smoothing
B: Intermediate data
C: Target data for sharpening
D: No conversion FIG. 29
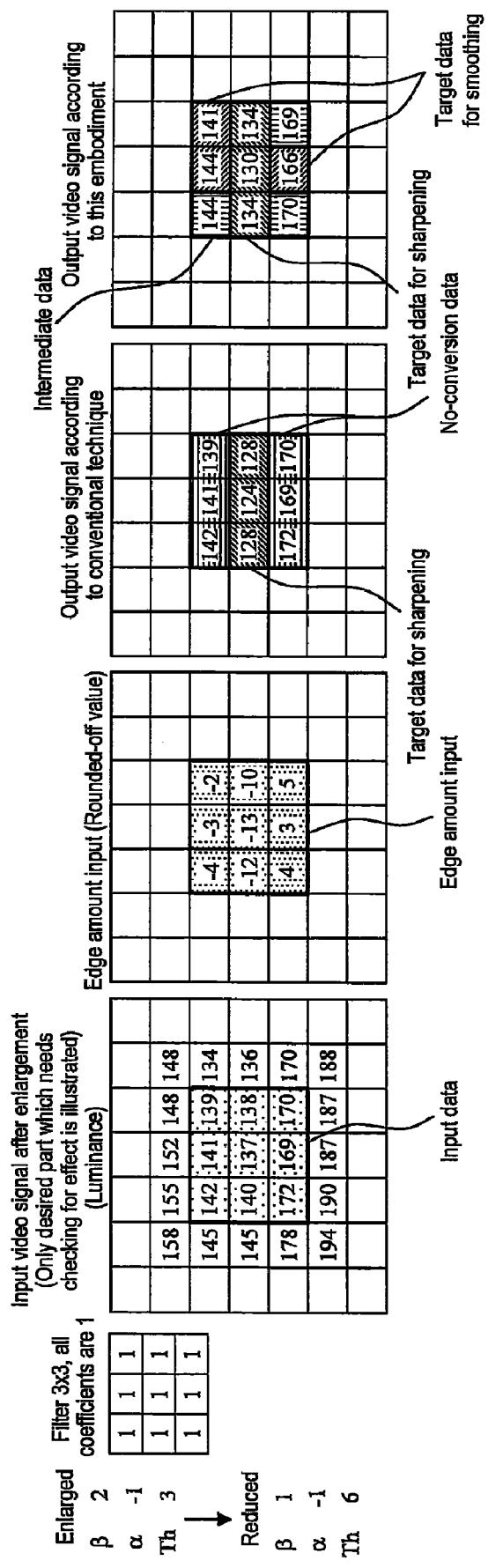
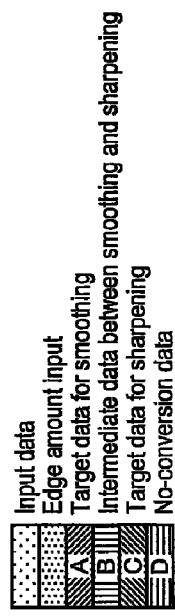

Case where only α is changed to be smaller

Case where only α is changed to be larger

Case where only β is changed to be smaller

Case where only β is changed to be larger

Case where only γ is changed to be smaller

Case where only γ is changed to be larger

Case where only Th is changed to be smaller

Case where only Th is changed to be larger

FIG. 40

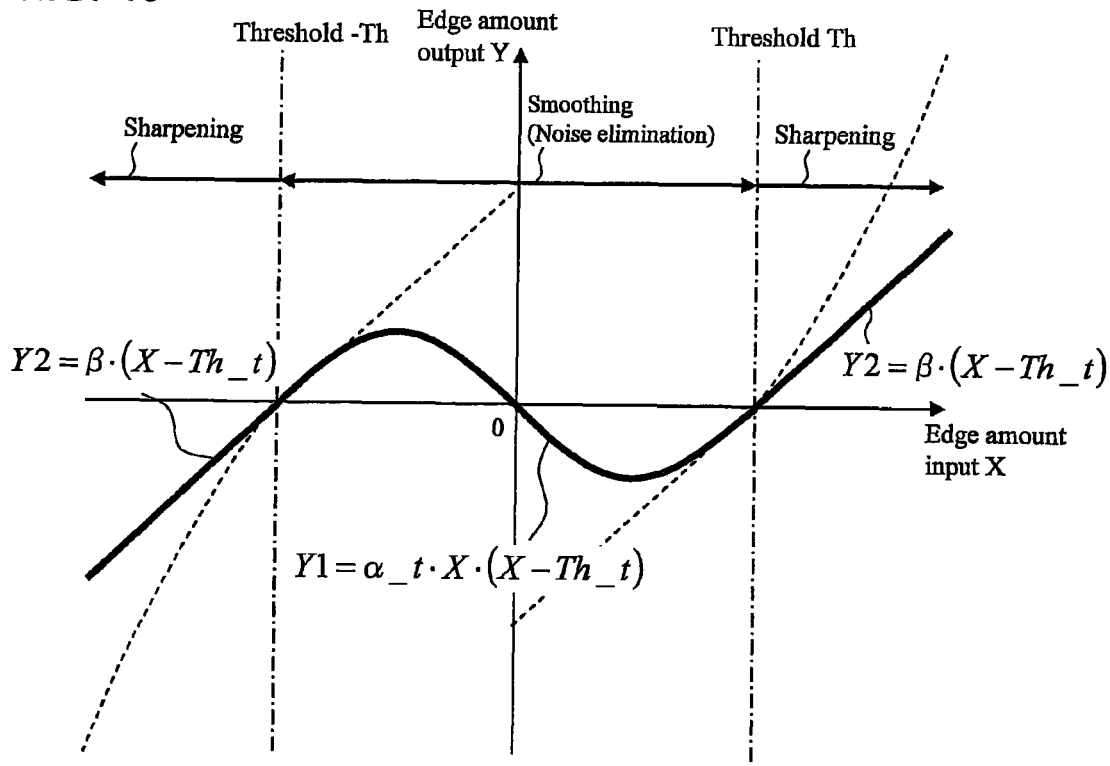

FIG. 41 (a)

$$Y1 = \alpha\_t \cdot X \cdot (X - Th\_t) \quad \cdots \text{Equation 4-1}$$

$$Y2 = \beta \cdot (X - Th\_t) \quad \cdots \text{Equation 4-2}$$

in the proviso that $$\alpha\_t = \begin{cases} \alpha & (X \geq 0) \\ -\alpha & (X < 0) \end{cases}$$

$$Th\_t = \begin{cases} Th & (X \geq 0) \\ -Th & (X < 0) \end{cases} \quad \cdots \text{Equation 4-3}$$

$$Y = \begin{cases} Y1 & (|X| < Th) \\ Y2 & (Th \leq |X|) \end{cases} \quad \cdots \text{Equation 4-4}$$

$$Y1 = \alpha \cdot X \cdot (X - Th\_t) \cdot (X + Th\_t) \quad \cdots \text{Equation 5-1}$$

$$Y2 = \beta \cdot (X - Th\_t) \quad \cdots \text{Equation 5-2}$$

in the proviso that $$Th\_t = \begin{cases} Th & (X \geq 0) \\ -Th & (X < 0) \end{cases} \quad \cdots \text{Equation 5-3}$$

$$Y = \begin{cases} Y1 & (|X| < Th) \\ Y2 & (Th \leq |X|) \end{cases} \quad \cdots \text{Equation 5-4}$$

VIDEO SIGNAL PROCESSING DEVICE AND VIDEO DISPLAY DEVICE

BACKGROUND OF THE INVENTION

1. Field of the Invention

The present invention relates to a video signal processing technique, and relates to a video signal processing technique with which sharpening processing and smoothing processing of a video image are performed by use of a spacial filter.

2. Description of the Related Art

An Input video image includes various noises and distortions. Eliminating such causes of degrading a video image can improve viewability of the video image, and also, can extract and enhance useful information. Such processing is one of the important operations in image processing. Typical approaches of image processing include 1) contrast enhancement by density conversion, 2) smoothing for noise elimination, and 3) sharpening for edge enhancement. The smoothing processing/sharpening processing correspond to the enhancement processing of a low frequency component/a high frequency component of an image. If a density value of an image at a part such as a contour part, which density value should have a sharp change has a mild change, the image by nature has a figure with its contour blurred. Enhancing the change in the density of such an image to obtain a sharp image is called sharpening. One approach of the sharpening is a method of subtracting, from an original image, a result obtained by filtering the original image (sharpening operator).

Meanwhile, the smoothing processing includes an approach in which an operator of 3×3, for example, is moved along an original image and a computation is performed on each component value of the operator and a corresponding one of pixel values of the original image.

There has been known a circuit by which sharpening and smoothing an image in a display unit of a device such as a television receiver, a personal computer, and a mobile phone can be performed in accordance with the above-mentioned principle. FIG. 30 is a diagram illustrating a relationship between an edge amount input (X axis) and an edge amount output (Y axis) in sharpening processing which is described in a first embodiment of Patent Document 1 below.

$\beta$: a parameter indicating the strength of sharpening    [Formula 1]

$Th$: a parameter determining a range in which an input is regarded as a noise $$Y = \begin{cases} 0 & (|X| \leq Th) \\ \beta \cdot X & (Th < |X|) \end{cases}$$

Here, the unsharp mask (USM) of a sharpening processing algorithm will be described with reference to FIG. 1A and FIG. 30. Firstly, a difference (edge amount input) between an input video signal (RGB or YUV) and an input image signal around the input video signal (spacial filter output) is obtained. In this respect, the spacial filter output is data obtained by smoothing the input video signal. Hereinbelow, the smoothing is regarded as a synonym for noise elimination.

In the sharpening technique, the sharpening for enhancing the sharpness is performed by multiplying an edge amount by use of parameters and adding the result to target pixel data, the parameters being defined as a threshold (Th) set on the X axis and a gain ($\beta$) indicating the strength of the sharpening. As shown in FIG. 30, when an absolute value of the edge amount input is smaller than the threshold Th, the edge amount input is regarded as a noise and no sharpening is performed. This is because it is favorable in teens of image quality not to perform sharpening. A range in which the input is regarded as a noise can be specified by the threshold. The gain is a parameter used to convert the edge amount input. The strength of sharpening is adjustable by increasing or decreasing the gain. Note that the processing image by the USM will be described by using FIG. 1C later.

FIG. 31 is a diagram illustrating an overview of a technique for smoothing and sharpening which is described in a fourth embodiment of Patent Document 1.

$\alpha$: a parameter indicating the strength of smoothing    [Formula 2]

$\beta$: a parameter indicating the strength of sharpening $\gamma$: a parameter of an intersection with an edge amount output ($Y$) axis $Th$: a parameter of a threshold at which switching is made between a smoothing conversion and a sharpening conversion $$Y = \begin{cases} \alpha \cdot X & (|X| \leq Th) \\ \beta \cdot X + \gamma & (Th < |X|) \end{cases}$$

Here, $\alpha$ is a parameter indicating the strength of smoothing; $\beta$ is a parameter indicating the strength of sharpening; $\gamma$ is a parameter of an intersection with an edge amount output (Y) axis; and a threshold parameter Th is a value of the edge amount input at which switching is made between a smoothing conversion and a sharpening conversion. The use of this technique (the fourth embodiment) enables smoothing in a case where an absolute value of the edge amount input is not more than the threshold, as well as sharpening in a case where the absolute value is not less than the threshold.

[Patent Document]Japanese Patent Application Publication No. Hei 3-245675

DISCLOSURE OF THE INVENTION

Problems to be Solved by the Invention

The technique in Patent Document 1 described above requires settings of four parameters of the threshold Th, $\alpha$, $\beta$, and $\gamma$ (see FIG. 31 and Formula 2 above). Moreover, it is not allowed to adjust only one of the four parameters in order that X-Y input-output conversions keep continuity in input-output characteristics across the threshold Th. Furthermore, Patent Document 1 lacks a description of a behavior at the enlargement or reduction of an image, and thus it is unclear as to how the four parameters should be set, or the like. For example, Patent Document 1 does not disclose how parameters should be set to achieve high quality image and to keep the continuity in a case where an enlarged image is to be converted by both smoothing processing and sharpening processing.

FIG. 32 to FIG. 39 are diagrams of examples of edge amount input-output characteristics obtained by adjusting only a single one of the parameters $\alpha$, $\beta$, $\gamma$, and Th with respect to basic conversion characteristics illustrated in FIG. 31 of the above-mentioned fourth embodiment of Patent Document 1, where the parameters $\alpha$, $\beta$, $\gamma$, and Th are used as bases and each of the parameters $\alpha$, $\beta$, $\gamma$, and Th is independently changed slightly or largely. FIG. 32 is a diagram illustrating an example in a case where only $\alpha$ is changed to be smaller than the one illustrated in FIG. 31. In this case, even though α indicating the strength of smoothing is made smaller, it becomes impossible to keep the continuity of the smoothing input-output characteristic and the sharpening input-output characteristic around the threshold as shown in FIG. 32, since the smoothing characteristic inclines less steeply. In other words, it is found that adjusting only a single parameter spoils the keeping of the continuity. Meanwhile, it is found that in a case where only α is changed to be larger as shown in FIG. 33, it becomes impossible to keep the continuity of the smoothing input-output characteristic and the sharpening input-output characteristic around the threshold since the smoothing characteristic inclines more steeply. Likewise, in a case where only β is changed to be smaller as shown in FIG. 34, it becomes impossible to keep the continuity of the smoothing input-output characteristic and the sharpening input-output characteristic around the threshold since the sharpening characteristic inclines less steeply and thus has an intersection with the X axis located farther from the origin. Meanwhile, in a case where only β is changed to be larger as shown in FIG. 35, it becomes impossible to keep the continuity of the smoothing input-output characteristic and the sharpening input-output characteristic around the threshold since the sharpening characteristic inclines more steeply and thus has an intersection with the X axis located closer to the origin.

Further, in a case where only γ is changed to be smaller as shown in FIG. 36, it likewise becomes impossible to keep the continuity of the smoothing input-output characteristic and the sharpening input-output characteristic around the threshold since an intersection γ of the Y axis and an extended line of a sharpening straight line is located closer to the origin. In a case where only γ is changed to be larger as shown in FIG. 37 as well, it likewise becomes impossible to keep the continuity.

Furthermore, in a case where only Th is changed to be smaller or larger as shown in FIG. 38 or FIG. 39, it likewise becomes impossible to keep the continuity of the smoothing input-output characteristic and the sharpening input-output characteristic around the threshold.

As has been described, the technique described in Patent Document 1 requires the use of the four parameters and involves a problem that an adjustment of one of the parameters spoils the keeping of the continuity of the smoothing input-output characteristic and the sharpening input-output characteristic around the threshold.

SUMMARY OF THE INVENTION

The present invention aims to reduce the number of parameters to be used and to keep continuity of the smoothing input-output characteristic and the sharpening input-output characteristic even after adjusting one of the parameters. The present invention also aims to enhance freedom in a parameter adjustment.

Means for Solving the Problems

One aspect of the present invention provides a video signal circuit which performs smoothing processing and sharpening processing on an input video signal to obtain an output video signal, the video signal processing circuit characterized in that when an edge amount input (X) of the input video signal is to be converted to an edge amount output (Y), input-output characteristics of a video signal are determined by providing a first function (Function 1) and a second function (Function 2) and by setting at least one of three factors as a variable parameter, where in a positive range of X of an X-Y plane defined by the edge amount input X and the edge amount output Y, the first function passes an origin and performs smoothing processing on condition that $0<X<Th1$ and the second function passes a point (Th1, 0) on an X axis at which the threshold is set to a value of X and performs smoothing processing on condition that $0<X<Th1$ and performs sharpening processing on condition that $X>Th1$, and the three factors are a smoothing coefficient ($\alpha1$) for determining the strength of the smoothing processing, a sharpening coefficient ($\beta1$) for determining the strength of the sharpening processing, and the threshold (Th1) for determining switching between the smoothing processing and the sharpening processing.

Also provided is a video signal circuit which performs smoothing processing and sharpening processing on an input video signal to obtain an output video signal, the video signal processing circuit characterized in that when an edge amount input (X) of the input video signal is to be converted to an edge amount output (Y), input-output characteristics of a video signal are determined by providing a first function (Function 1) and a second function (Function 2) and by setting at least one of three factors as a variable parameter, where in a negative range of X of an X-Y plane defined by the edge amount input X and the edge amount output Y, the first function passes an origin and performs smoothing processing on condition that $Th2<X<0$ and the second function passes a point (Th2, 0) on an X axis at which the threshold is set to a value of X and performs smoothing processing on condition that $Th2<X<0$ and performs sharpening processing on condition that $X<Th2$, and the three factors are a smoothing coefficient ($\alpha2$) for determining the strength of the smoothing processing, a sharpening coefficient ($\beta2$) for determining the strength of the sharpening processing, and the threshold (Th2) for determining switching between the smoothing processing and the sharpening processing. Here, the smoothing coefficients ($\alpha1$, $\alpha2$) are coefficients for the first function (Function 1) while the sharpening coefficients ($\beta1$, $\beta2$) are coefficients for the second function (Function 2). In this regard, a coefficient denotes an inclination in a case where, for example, Function 1 or 2 described above is a straight line, while it denotes a magnification by which a variable or a constant value is multiplied in a case where Function 1 or 2 is a curve.

The present invention may be a display device characterized by including a display unit which performs a display in accordance with the output video signal of the video signal processing circuit described above. In addition, the present invention may also be a mobile terminal device characterized by including the display device. Another aspect of the present invention provides a video signal processing method for performing smoothing processing and sharpening processing on an input video signal to obtain an output video signal, the video signal processing method characterized by including the steps of: setting a threshold Th for determining switching between the smoothing processing and the sharpening processing to (Y=0) on an X axis in X-Y input-output characteristics indicating a relationship to be obtained by converting an edge amount input (X) of the input video signal to an edge amount output (Y); and performing conversion processing on the basis of input-output conversion characteristics which are determined when a first function and a second function cross each other, the first function passing an origin and performing smoothing processing on condition that $|X|<Th$ ($-Th<X<Th$), the second function passing the threshold, performing smoothing processing on condition that $|X|<Th$ ($-Th<X<Th$) and performing sharpening processing on condition that $|X|>Th$ ($X<-Th$ or $X>Th$).

Effects of the Invention

According to the present invention, it is possible to obtain a smooth high-quality video image since switching between data to be sharpened and data to be smoothed is always continuous in X-Y input-output characteristics related to an edge amount input X and an edge amount output Y, the edge amount input X being a difference between an input video signal and an output signal obtained by processing the input video signal by use of a spacial filter, the edge amount output Y being obtained by converting the edge amount input X.

In addition, it is possible to obtain a different output video signal depending on any of the three parameters, so that high-quality video image can be obtained even when the image is enlarged or reduced in size (e.g., portrait display or landscape display of TV broadcasting). In addition, since an adjustment can be made in accordance with properties (resolution, screen size, the number of bits in a video image) of a device which displays the video image, a high-quality video image can be obtained. Furthermore, it is possible to enhance the degree of freedom of the parameter adjustment.

BRIEF DESCRIPTION OF THE DRAWINGS

FIG. 8 is a diagram illustrating an example of the X-Y conversion characteristics observed when only Th is changed to be larger than the one in FIG. 2.

FIG. 16 is a diagram illustrating an example of a display related to enlargement/reduction of a displayed video image.

FIG. 18 is a diagram illustrating an overview of a video signal adjustment technique according to a second embodiment of the present invention.

FIG. 21 is a diagram illustrating an overview of a video signal adjustment technique according to a third embodiment of the present invention.

FIG. 24 is a schematic diagram illustrating ranges on the X axis of the smoothing processing and of the sharpening processing based on the video image processing technique according to this embodiment (Part a) and the conventional technique (Part b).

FIG. 29 is a diagram illustrating results obtained after the smoothing processing and the sharpening processing are compared between the case of FIG. 28 and a case where the display is reduced in size to be half, by illustrating examples.

FIG. 40 is a diagram illustrating an example where a conversion is changed from that in FIG. 18 which is the diagram illustrating the overview of the video signal adjustment technique according to the second embodiment of the present invention.

FIG. 41($b$) is a functional block diagram showing an example where a change is made from FIG. 19($b$) illustrating the second example of the video signal conversion circuit according to the second embodiment of the present invention.

FIG. 44($b$) is a functional block diagram showing an example where a change is made from FIG. 22($b$) illustrating the third example of the video signal conversion circuit according to the third embodiment of the present invention.

DESCRIPTION OF SYMBOLS

Figure 1A:
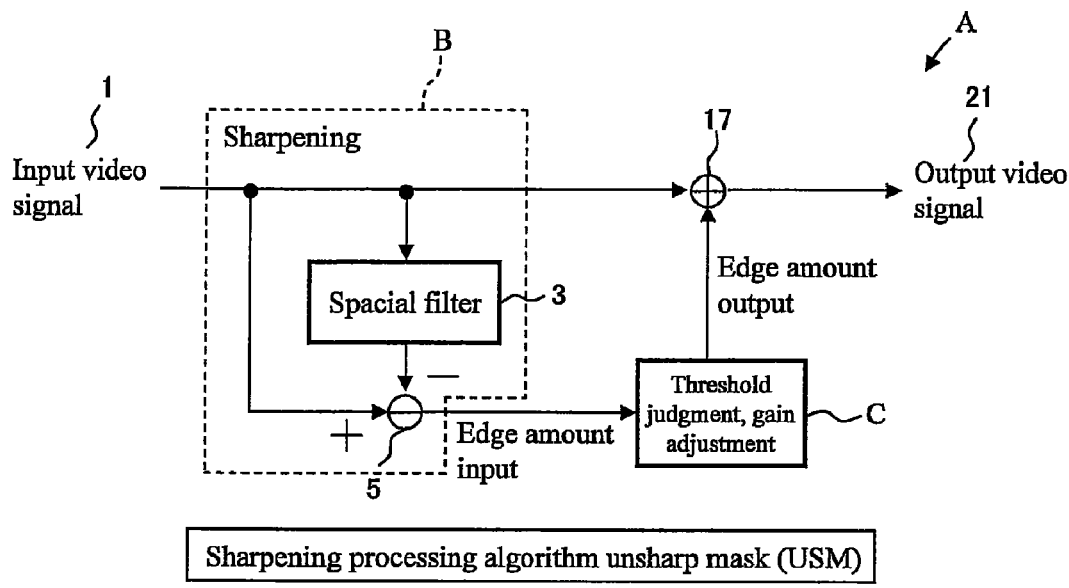
FIG. 1A is a functional block diagram illustrating an overview of a sharpening processing (unsharp mask (USM)) algorithm.

A . . . sharpening processing unit, B . . . peripheral circuits of a spacial filter, C1, C2, C3, C4, and C5 . . . video signal conversion circuit, D1 . . . video image, D2 and D3 . . . video image display area, 1 . . . input video signal, 3 . . . spacial filter, 5 . . . subtracter, 7 . . . threshold judgment unit, 11 . . . gain adjustment unit, 15 . . . multiplier, 17 . . . adder, 21 . . . output video signal Y, 31 . . . register, 32 . . . circuit for determining Equation 1-3, 33 . . . first arithmetic circuit for computing Equation 1-2, 34 . . . second arithmetic circuit for computing Equation 1-1, 35 . . . third arithmetic circuit for computing Equation 1-4, 51 . . . register, 52 . . . circuit for determining Equation 2-3, 53 . . . first arithmetic circuit for computing Equation 2-2, 54 . . . second arithmetic circuit for computing Equation 2-1, 55 . . . third arithmetic circuit for computing Equation 2-4, 71 . . . register, 72 . . . circuit for determining a threshold in Equation 3-3, 73 . . . first arithmetic circuit for computing Equation 3-2, 74 . . . second arithmetic circuit for computing Equation 3-1, 75 . . . third arithmetic circuit for computing Equation 3-4, 81 . . . register, 83 . . . circuit for determining Equation 4-3, 85 . . . first arithmetic circuit for computing Equation 4-2, 87 . . . second arithmetic circuit for computing Equation 4-1, 89 . . . third arithmetic circuit for computing Equation 4-4, 91 . . . register, 93 . . . circuit for determining Equation 5-3, 95 . . . first arithmetic circuit for computing Equation 5-2, 97 . . . second arithmetic circuit for computing Equation 5-1, 99 . . . third arithmetic circuit for computing Equation 5-4, 101 . . . input video signal, 103 . . . line memory, 105 . . . memory controller, 107 . . . spacial filter, 111 . . . delay circuit, 113 . . . subtraction circuit, 115 . . . edge amount input, 121 . . . display device, 123 . . . external connection terminal, 125 . . . controlling unit, 127 . . . external memory interface I/F, 131 . . . video signal processing unit, 131$a$ . . . sharpening smoothing processing unit, 131$b$ . . . γ correction unit, 133 . . . display unit, 141 . . . mobile terminal device, 143 . . . operation unit, 145 . . . radio communication unit, 147 . . . camera, 151 . . . dedicated memory unit, 153 . . . RAM/ROM, 155 . . . orientation detection unit, 157 . . . register, 161 . . . TV receiving unit, 163 . . . external connection terminal, 165 . . . external memory I/F, 167 . . . power supply (battery), 171 . . . controlling unit, 181 . . . video signal processing unit, 181$a$ . . . RGBYUV conversion unit, 181$b$ . . . sharpening smoothing processing unit, 181$c$ . . . YUVRGB conversion unit, 181$d$ . . . γ correction unit, 183 . . . display unit, 191 . . . mobile terminal device, 192 . . . Th (threshold) setting unit, 193 . . . β (sharpening) setting unit, 194 . . . α (smoothing) setting unit, 197 . . . antenna, 201 . . . radio wave tower, 203 . . . network, and 205 . . . server.

DETAILED DESCRIPTION OF THE INVENTION

An image processing technique according to embodiments of the present invention will be described hereinbelow with reference to the drawings. FIG. 1A is a functional block diagram illustrating an overview of a sharpening processing (unsharp mask (USM)) algorithm. As shown in FIG. 1A, firstly, a sharpening processing unit A calculates a difference (edge amount input) (reference symbol B) between an input video signal (RGB or YUV) and an input image signal around the input video signal (spacial filter output). In this respect, the spacial filter output is data obtained by smoothing the input video signal.

In the sharpening technique, the sharpening for enhancing the sharpness is performed by multiplying an edge amount by use of parameters and adding the result to target pixel data, the parameters being defined as a threshold (Th) set on the X axis and a gain (β) indicating the strength of the sharpening. In processing of threshold determination and a gain adjustment, when an absolute value of the edge amount input is smaller than the threshold Th, the edge amount input is regarded as a noise and no sharpening is performed on the signal. This is because it is favorable in terms of image quality not to perform sharpening. A range in which the input is regarded as a noise can be specified by the threshold. A gain used for the gain adjustment is a parameter for converting the edge amount input. The strength of sharpening is adjusted by increasing or decreasing the gain to obtain an output video signal Y. In this manner, the input video signal is converted into the output video signal.

Figure 1B:
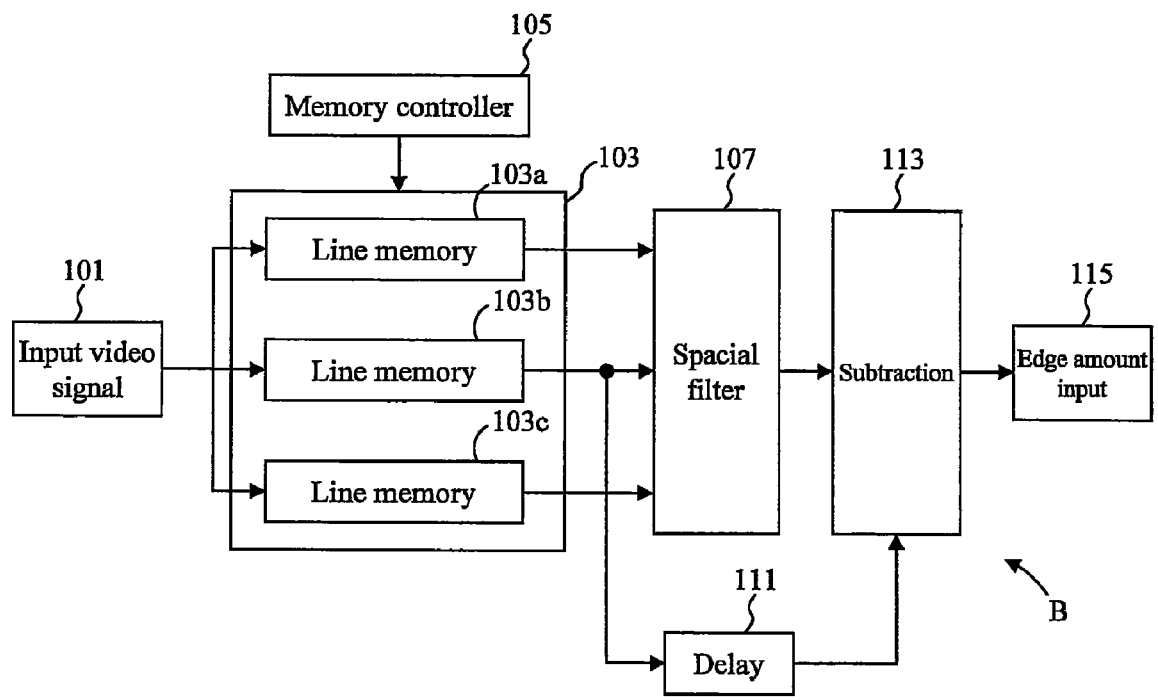
FIG. 1B is a functional block diagram illustrating a configuration example of peripheral circuits of a spacial filter, the example being the detail for the configuration denoted by the reference symbol B in FIG. 1A.

FIG. 1B is a functional block diagram illustrating a configuration example of peripheral circuits of the spacial filter, which is the detail for the configuration denoted by the reference symbol B in FIG. 1A. As shown in FIG. 1B, input video signals 101 are accumulated in line memories 103 (first to third line memories 103a to 103c) which are controlled by a memory controller 105, and then outputted to a spacial filter 107 in order. Video signals subjected to filtering by the spacial filter 107 are outputted to a subtraction circuit 113. The outputs from the line memories 103 are also outputted to a delay circuit 111, and are then outputted to the subtraction circuit 113 with a certain delay. The subtraction circuit 113 performs subtraction operation on both the input signals and thus outputs the result as an edge amount input 115.

Figure 1C:
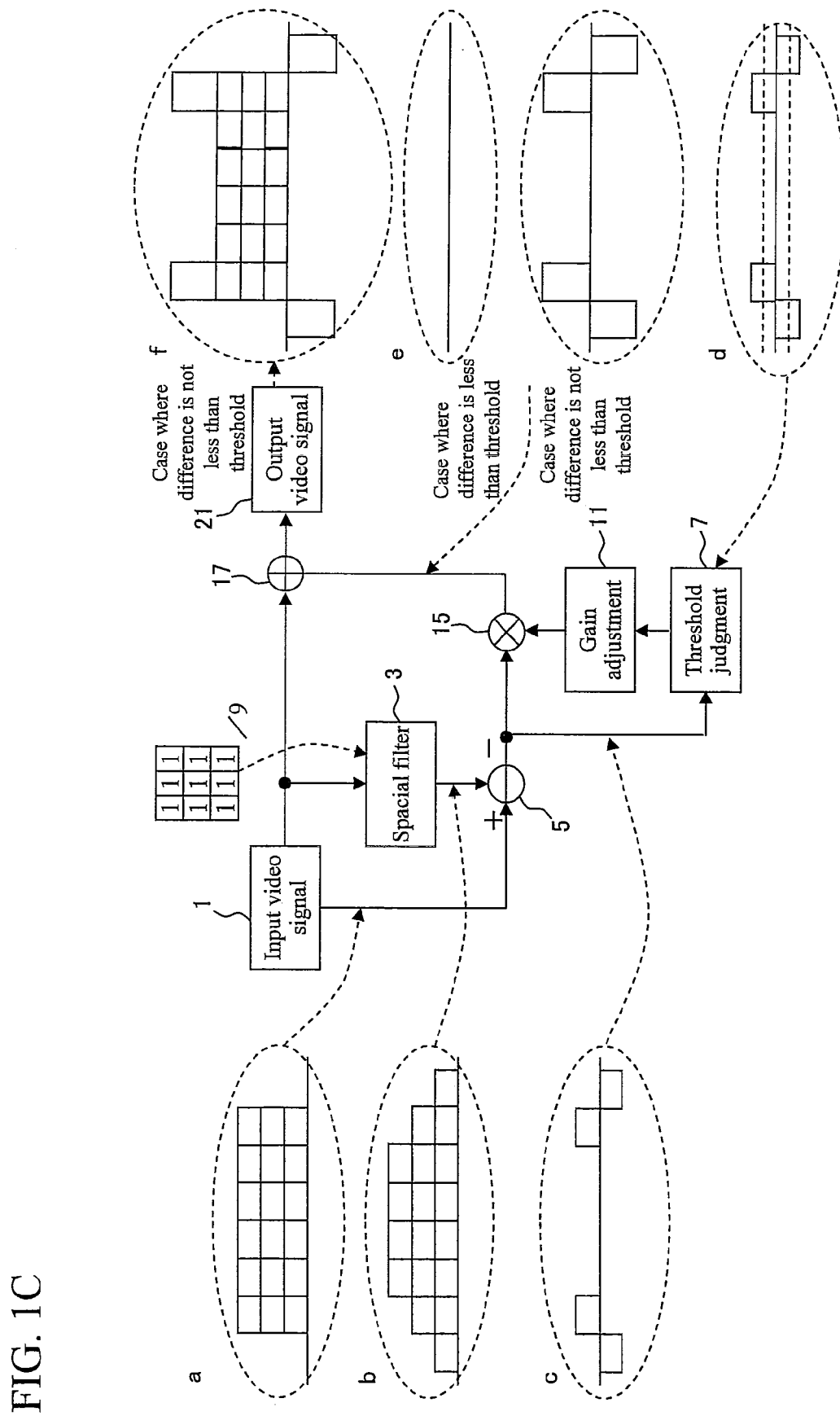
FIG. 1C is a diagram illustrating the image of processing by the USM.

Next, the processing image by the USM will be described with reference to FIG. 1C. Each of diagrams drawn out of signal lines and denoted by reference symbols a to f is a schematic diagram, of pixel values of a point of an image when the pixel value is seen from the side, in which the pixel values are expressed in a vertical height direction. Consider a case where an input video signal 1 is illustrated by an image denoted by the reference symbol a. If the input video signal 1 is filtered by a spacial filter 3 of 3×3, for example, the input video signal 1 is smoothed as denoted by the reference symbol b. Next, a subtracter 5 subtracts b from a, and thus a difference is obtained as denoted by the reference symbol c. By use of a signal denoted by the reference symbol c, a threshold judgment unit 7 makes a judgment as denoted by the reference symbol d. A gain adjustment unit 11 performs a gain adjustment on the signal if the signal represents the difference not less than a threshold. On the other hand, if the signal represents the difference less than the threshold, the signal vanishes (reference symbol e). An adder 17 adds an input signal a to the signal representing the difference not less than the threshold to thereby obtain an output video signal Y 21, i.e., a signal which is subjected to sharpening and denoted by the reference symbol f.

Firstly, a video processing technique according to a first embodiment of the present invention will be described with reference to the drawings.

Meanwhile, throughout all the embodiments described herein, a description will be given, as an example, of a case where parameters ($\alpha 1$, $\beta 1$, and Th1) used in a positive range of X and parameters ($\alpha 2$, $\beta 2$, and Th2) used in a negative range of X can be converted by using the same parameters ($\alpha$, $\beta$, and Th). Hereinbelow, a smoothing parameter $\alpha$ is defined to be smaller as it is closer to 0; a sharpening parameter $\beta$ is defined to be smaller as it is closer to 0; and a threshold parameter Th is defined to be smaller as it is closer to 0.

Figure 2:
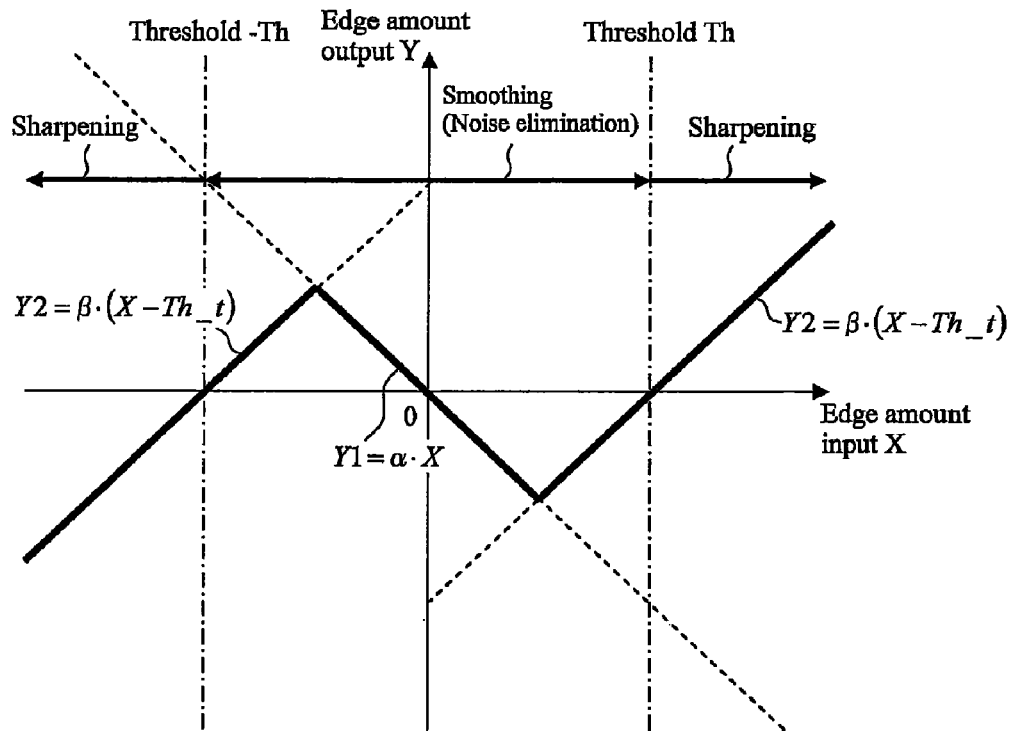
FIG. 2 is a diagram illustrating an overview of the video signal adjustment technique according to a first embodiment of the present invention.

FIG. 2 is a diagram illustrating the principle of the video signal adjustment technique according to this embodiment, and is also a diagram for performing an X-Y conversion. FIG. 2 also shows equations for the X-Y conversion.

Figure 31:
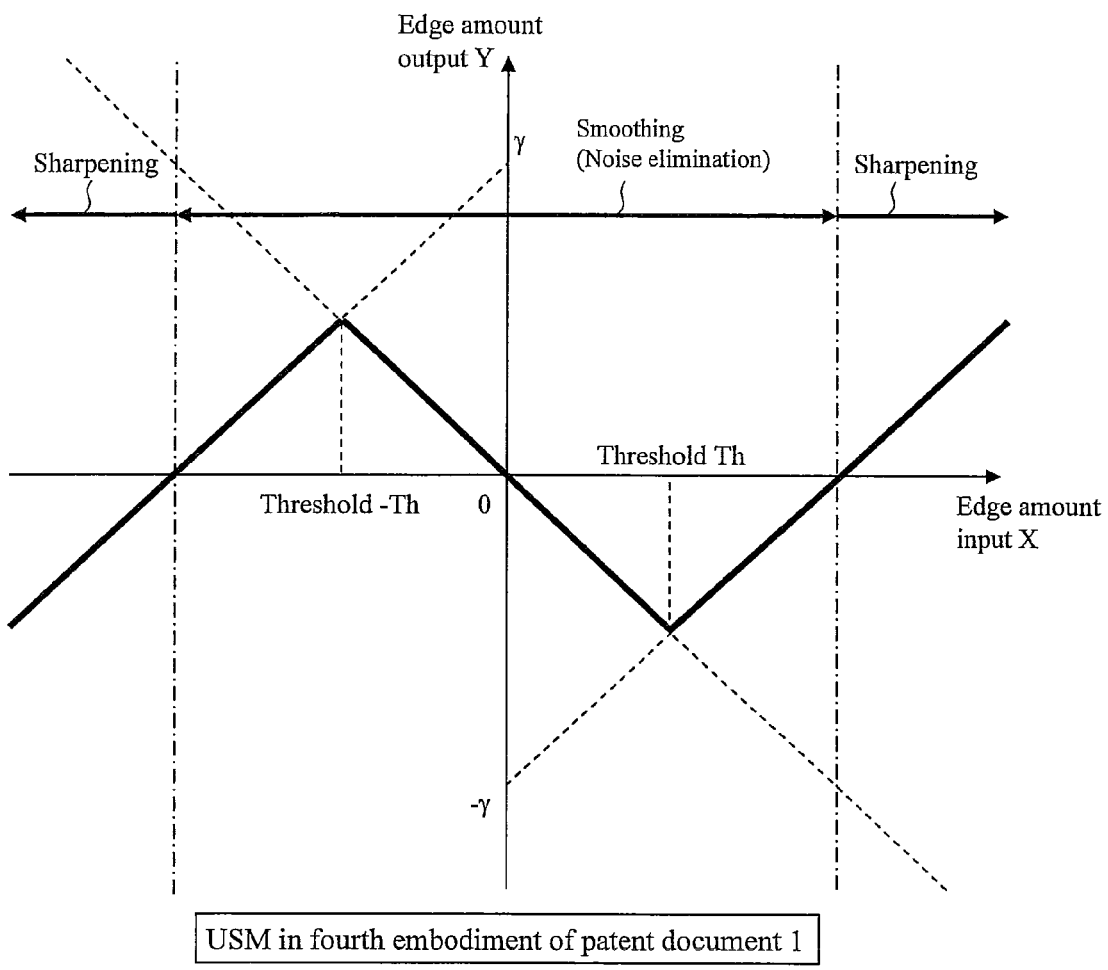
FIG. 31 is a diagram illustrating an overview of a technique for smoothing and sharpening which is described in a fourth embodiment of Patent Document 1.
Figure 32:
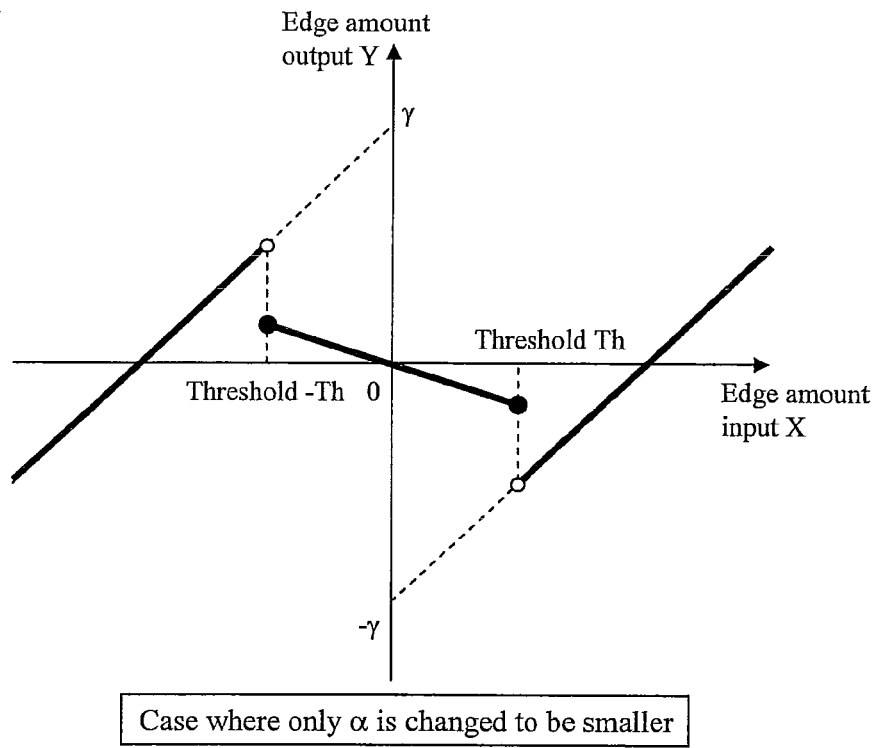
FIG. 32 is a diagram of an example of conversion characteristics obtained when only α is changed to be smaller than that in FIG. 31.
Figure 33:
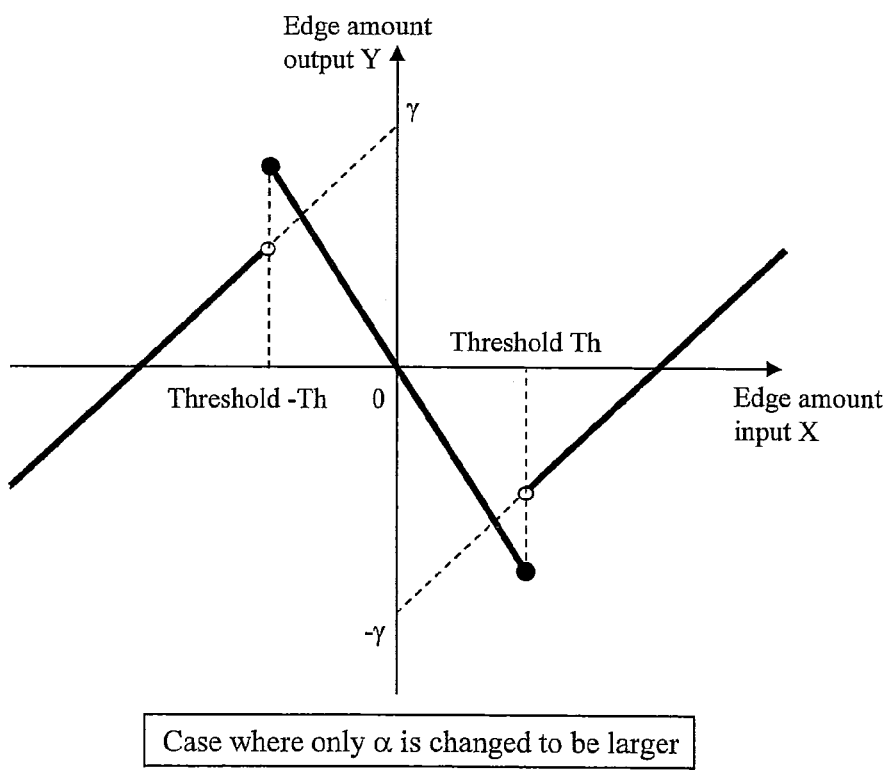
FIG. 33 is a diagram of an example of the X-Y conversion characteristics obtained when only α is changed to be larger than that in FIG. 31.
Figure 34:
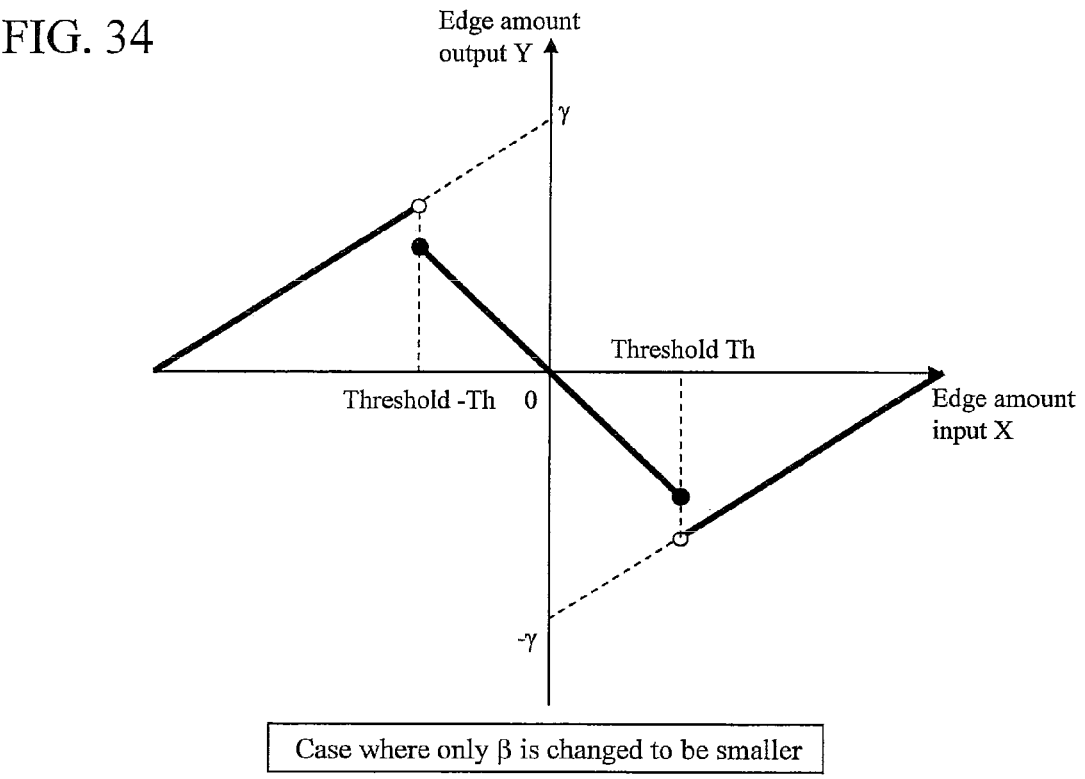
FIG. 34 is a diagram of an example of the X-Y conversion characteristics obtained when only β is changed to be smaller than that in FIG. 31.
Figure 35:
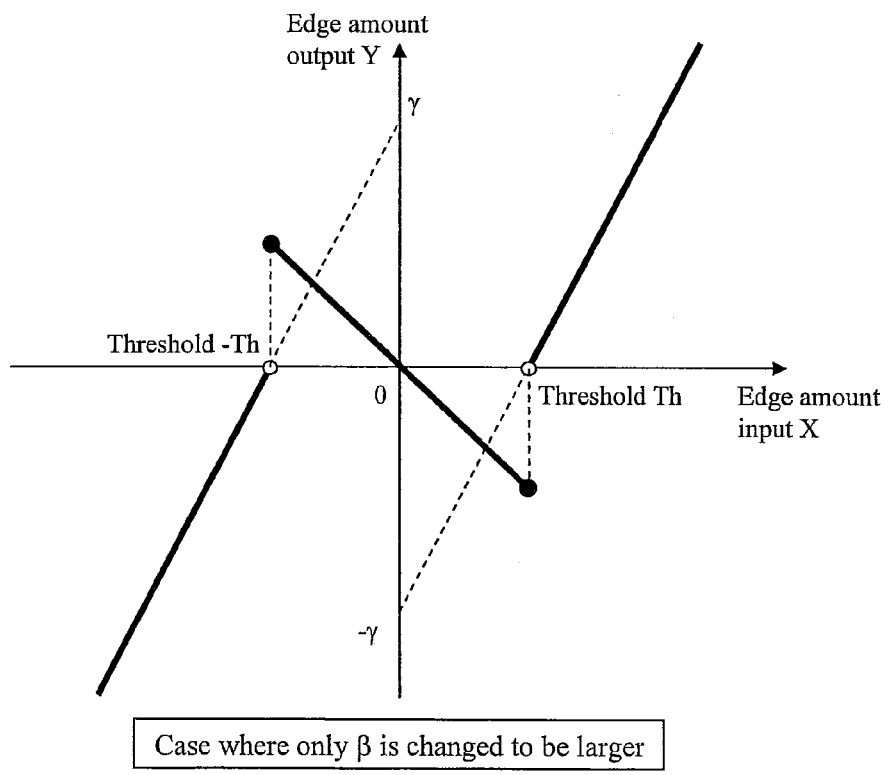
FIG. 35 is a diagram of an example of the X-Y conversion characteristics obtained when only β is changed to be larger than that in FIG. 31.
Figure 36:
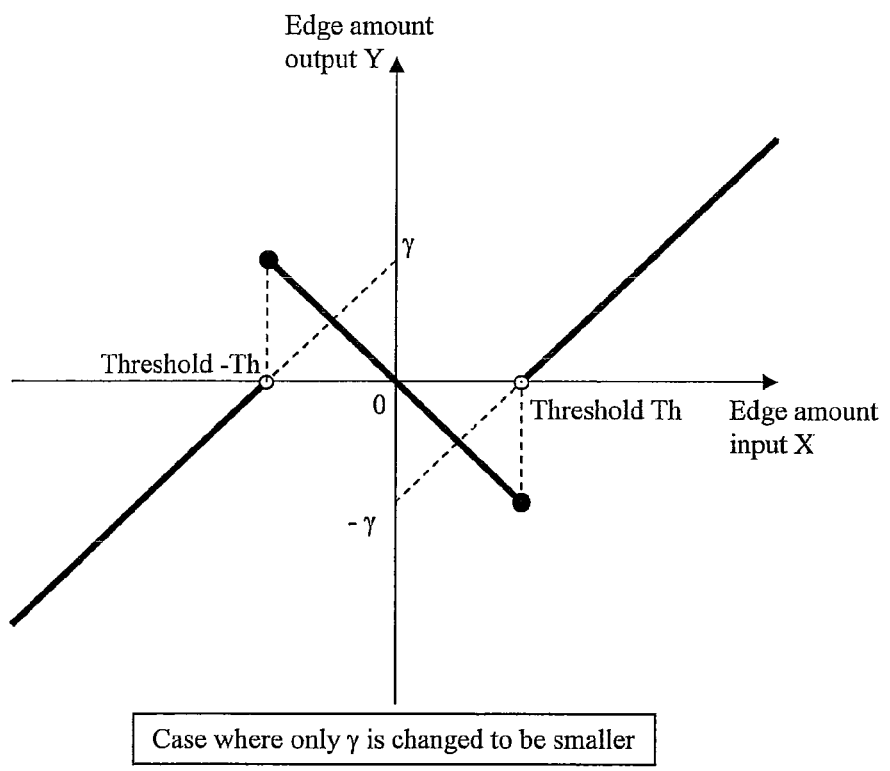
FIG. 36 is a diagram of an example of the X-Y conversion characteristics obtained when only γ is changed to be smaller than that in FIG. 31.
Figure 37:
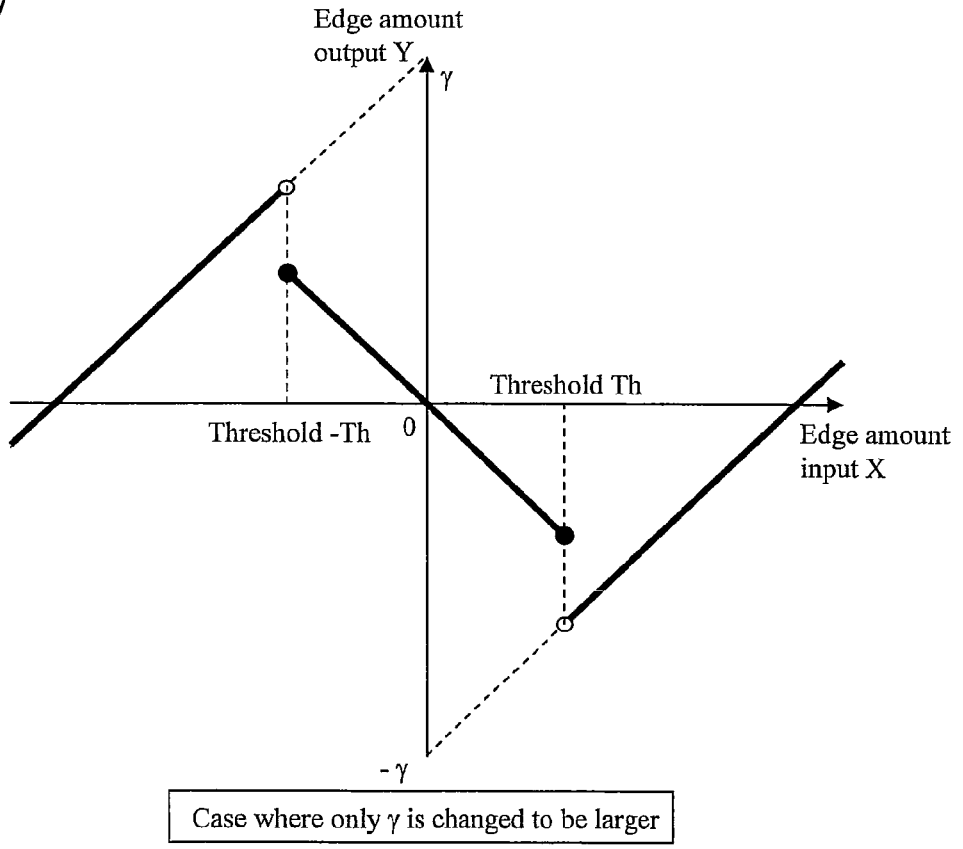
FIG. 37 is a diagram of an example of the X-Y conversion characteristics obtained when only γ is changed to be larger than that in FIG. 31.
Figure 38:
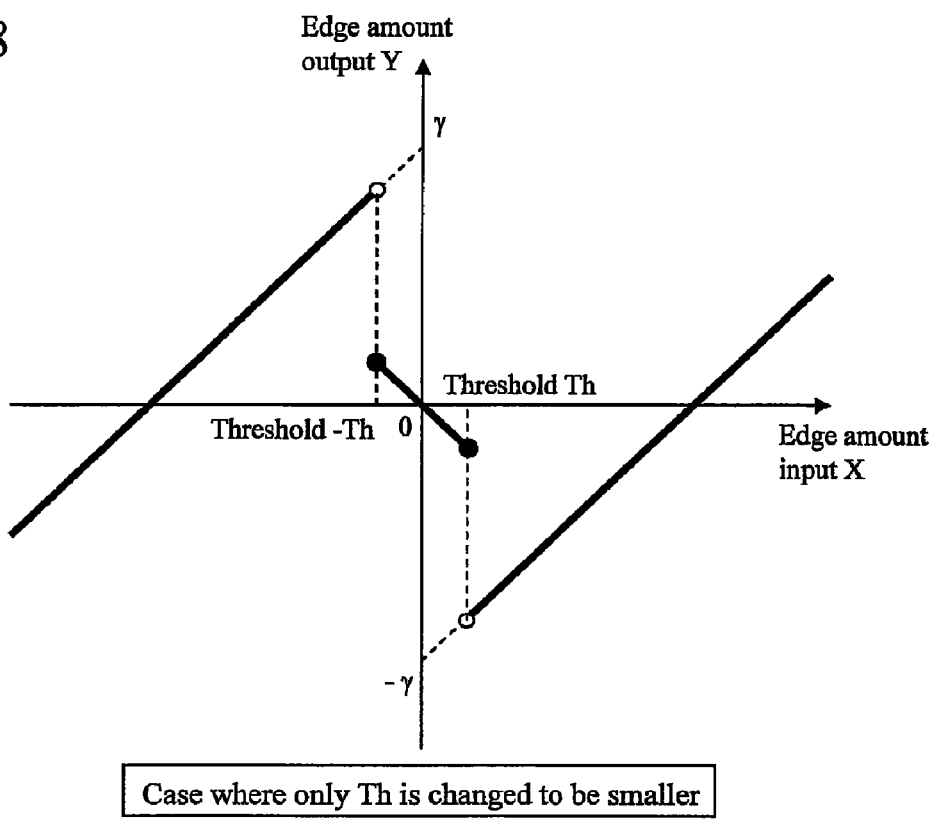
FIG. 38 is a diagram of an example of the X-Y conversion characteristics obtained when only Th is changed to be smaller than that in FIG. 31.
Figure 39:
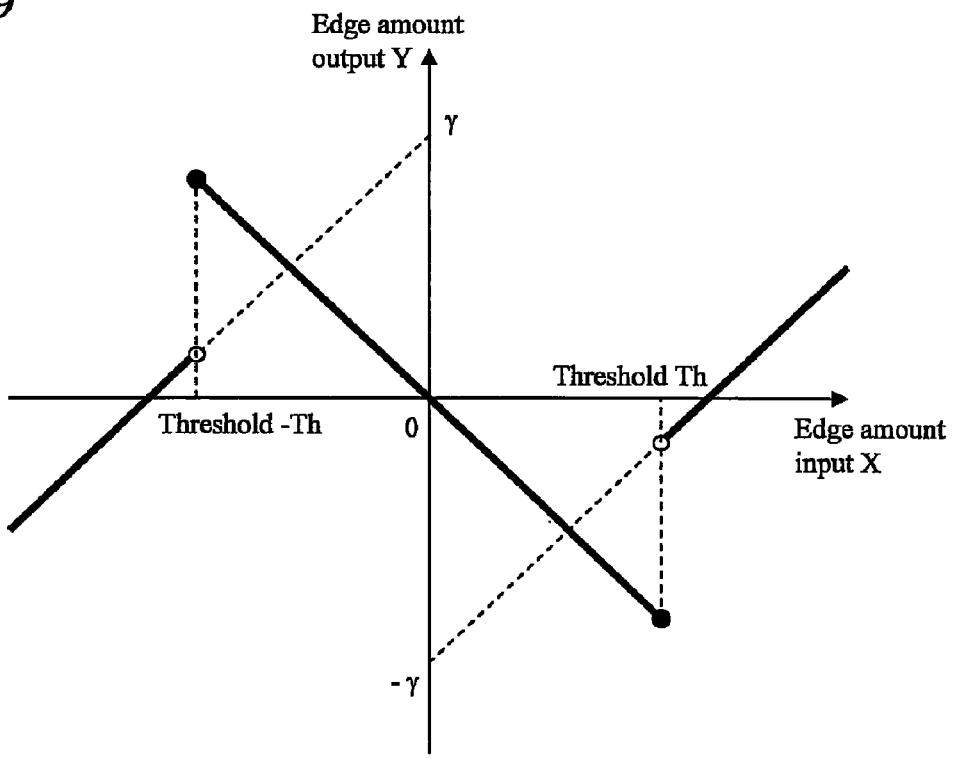
FIG. 39 is a diagram of an example of the X-Y conversion characteristics obtained when only Th is changed to be larger than that in FIG. 31.

In the X-Y conversion chart as illustrated in FIG. 31, switching is made between a smoothing processing conversion and a sharpening processing conversion at the threshold parameter Th. In contrast, in an X-Y conversion chart according to this embodiment as shown in FIG. 2, the threshold parameter Th is set to be Y=0, i.e., the threshold Th is set on the X axis, and a function to define the sharpening is set in a way to pass Th. In addition, a range between −Th and +Th is set as one in which smoothing (noise elimination) processing is performed, while a range outside of the above range is set as one in which sharpening processing is performed. In this case, as shown in the equations in the drawing, among two equations which are $Y1=\alpha \cdot X$ and $Y2=\beta \cdot (X-\text{Th\_t})$ and are expressed by linear straight lines, intersections of the equation Y1 and the equation Y2 are the maximum value and the minimum value of the X-Y conversion equations, where the equation Y1 is on the inner side on the X axis while the equation Y2 is on the outer side on the X axis. In these conversion equations, parameters to be used (coefficients $\alpha$ and $\beta$ of the linear equation) are set to be formed by only three factors, i.e., a parameter $\alpha$ indicating the strength of smoothing, a parameter $\beta$ indicating the strength of sharpening, and a threshold Th on the X axis which defines switching between the smoothing processing and the sharpening processing.

More specifically, as shown in FIG. 2, input-output characteristics of a video signal can be determined by three parameters of, in a positive range of X: an inclination of a first function (smoothing parameter $\alpha$) which continuously connects (X, Y)=(0, 0) and (X, Y)=(Th, Y1<0); an inclination of a second function (sharpening parameter $\beta$) which continuously connects (X, Y)=(0, Y2<0) and (X, Y)=(Th, 0) and which further extends in a X>Th direction; and a value on the X axis which defines the switching between the smoothing processing and the sharpening processing (threshold parameter Th). The inclinations of the functions can be changed according to the values of $\alpha$ and $\beta$ while an intersection with the X axis and the function can be determined by Th.

Figure 3:
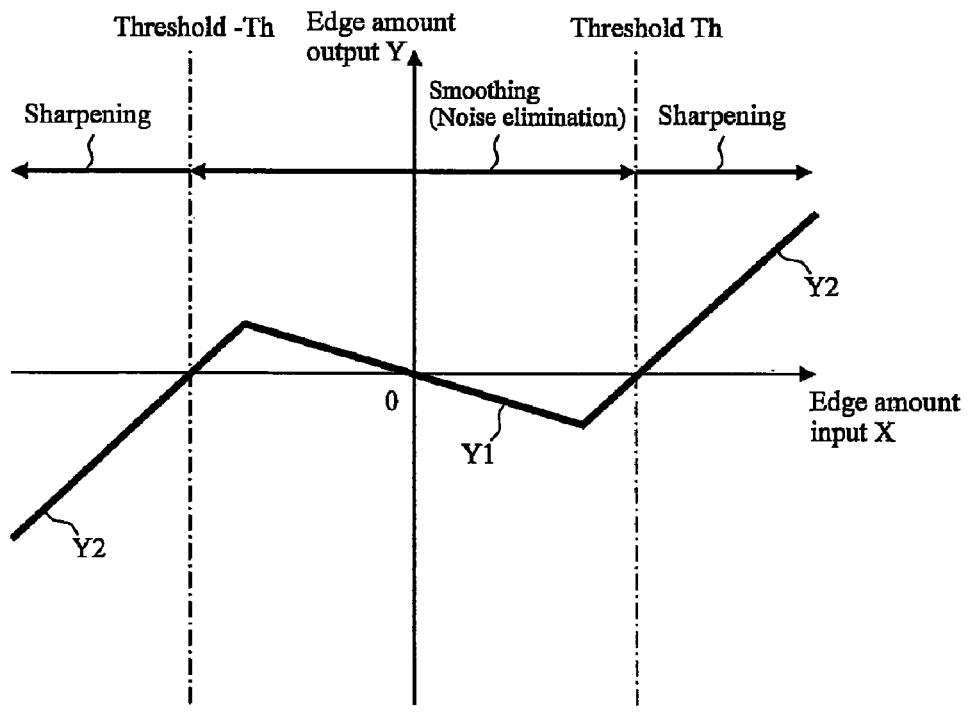
FIG. 3 is a diagram illustrating an example of X-Y conversion characteristics observed when only α is changed to be smaller than the one in FIG. 2.

FIG. 3 to FIG. 8 are diagrams each illustrating an example of the input-output characteristics (Y1, Y2) observed when any one of the three parameters $\alpha$, $\beta$, and Th shown in FIG. 2 is independently made smaller or larger. FIG. 3 is an example where only $\alpha$ is changed to be smaller. In this example, although Y1 is less inclined, it is possible to keep the continuity of the X-Y conversion equations because Y2 does not depend on $\alpha$ and the maximum value and the minimum value of Y are determined as intersections of Y1 and Y2.

Figure 4:
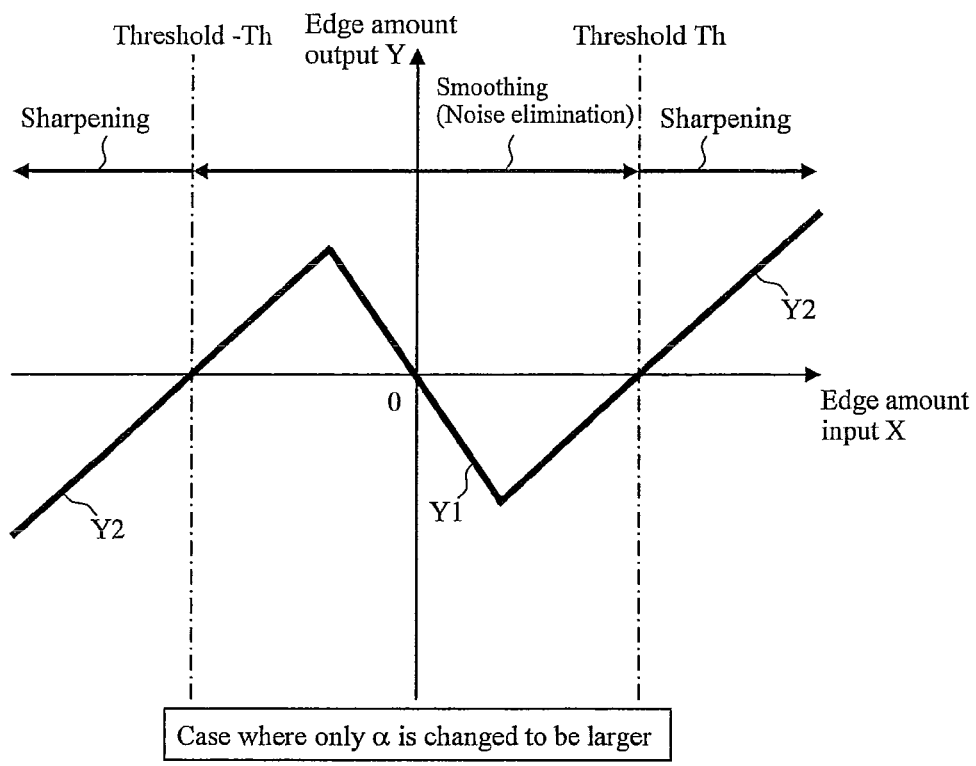
FIG. 4 is a diagram illustrating an example of the X-Y conversion characteristics observed when only α is changed to be larger than the one in FIG. 2.
Figure 5:
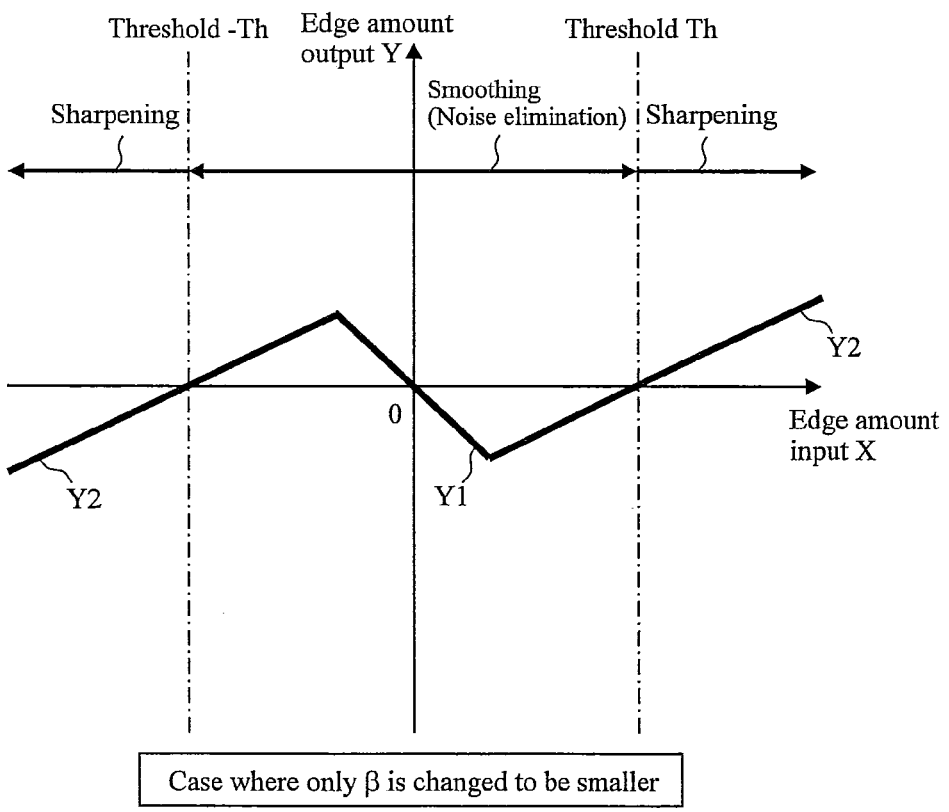
FIG. 5 is a diagram illustrating an example of the X-Y conversion characteristics observed when only β is changed to be smaller than the one in FIG. 2.
Figure 6:
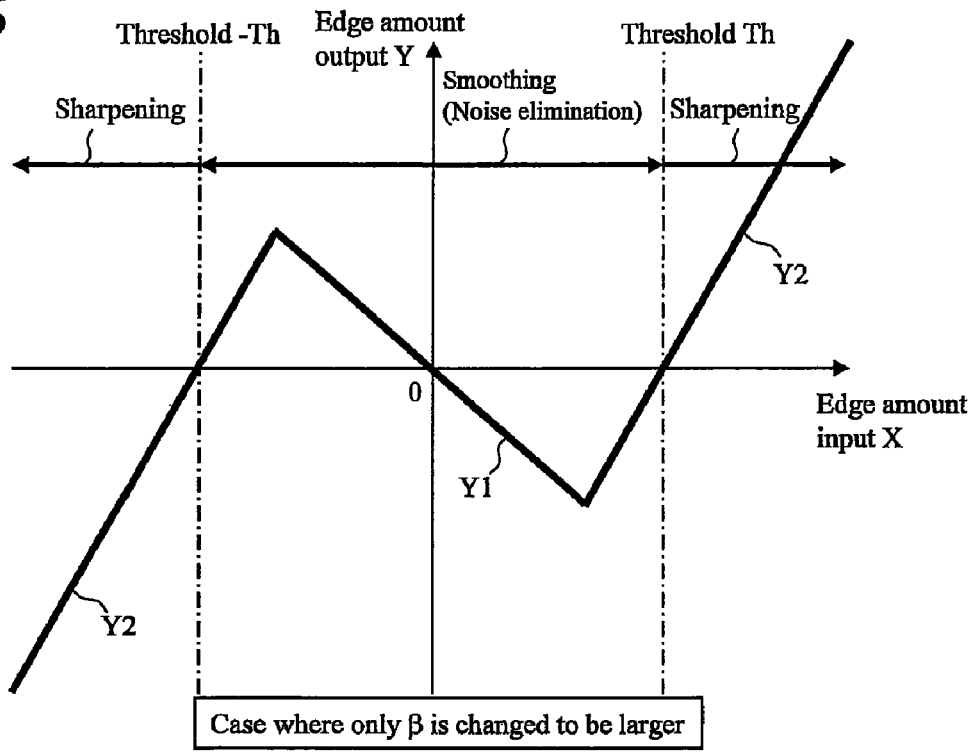
FIG. 6 is a diagram illustrating an example of the X-Y conversion characteristics observed when only β is changed to be larger than the one in FIG. 2.
Figure 7:
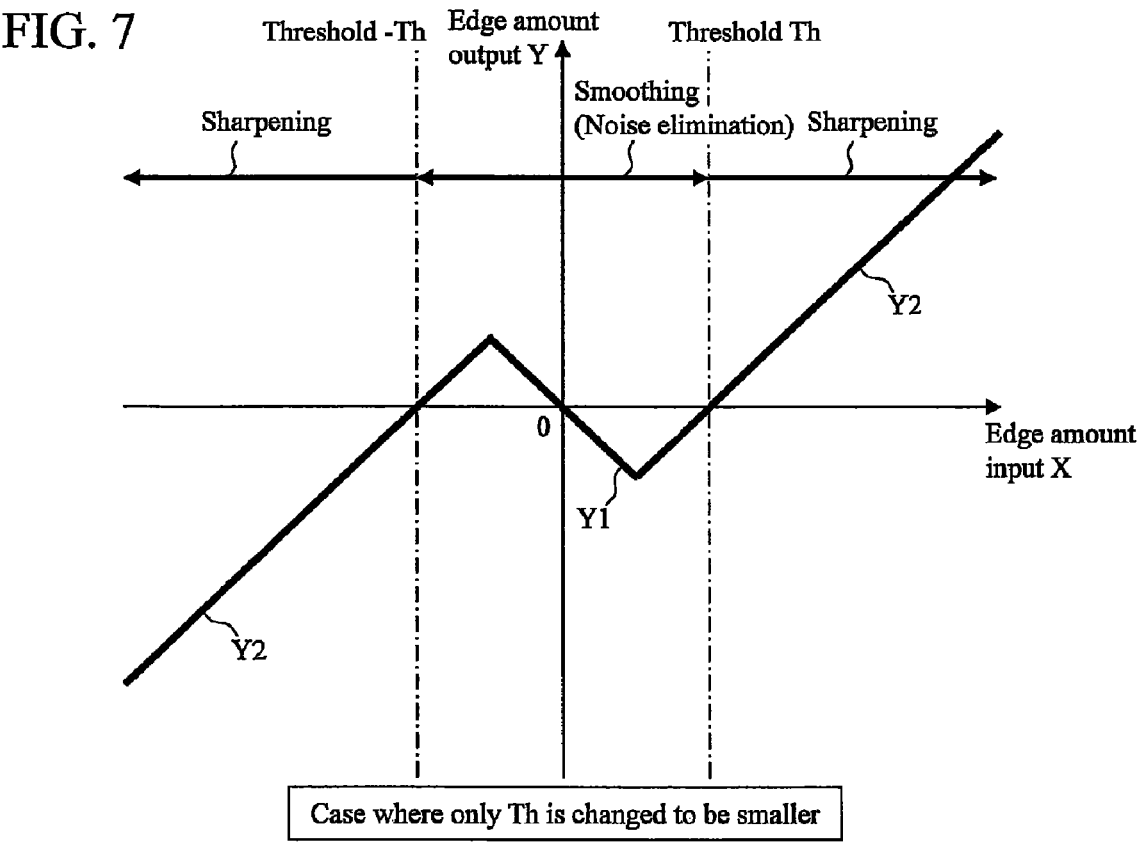
FIG. 7 is a diagram illustrating an example of the X-Y conversion characteristics observed when only Th is changed to be smaller than the one in FIG. 2.

FIG. 4 is an example where only $\alpha$ is changed to be larger. In this example, although Y1 is more inclined, it is possible to keep the continuity of the X-Y conversion equations because Y2 does not depend on $\alpha$ and the maximum value and the minimum value of Y are determined as intersections of Y1 and Y2. FIG. 5 is an example where only $\beta$ is changed to be smaller. In this example, although Y2 is less inclined, it is possible to keep the continuity of the X-Y conversion equations because Y1 does not depend on $\beta$ and the maximum value and the minimum value of Y are determined as intersections of Y1 and Y2. FIG. 6 is an example where only $\beta$ is changed to be larger. In this example, although Y2 is more inclined, it is possible to keep the continuity of the X-Y conversion equations because Y1 does not depend on $\beta$ and the maximum value and the minimum value of Y are determined as intersections of Y1 and Y2. FIG. 7 is an example where only Th is changed to be smaller. In this example, it is possible to keep the continuity of the X-Y conversion equations because the inclinations of Y1 and Y2 have no change and the maximum value and the minimum value of Y are determined as intersections of Y1 and Y2. The same applies to the case where only the Th is changed to be larger as shown in FIG. 8.

According to this embodiment, by setting the intersections of the sharpening characteristic data and the smoothing characteristic data to be on the inner side of the threshold Th, it is possible to change the sharpening parameter and the smoothing parameter independently of the threshold Th and to always keep continuity between sharpening characteristic data and smoothing characteristic data. Accordingly, this embodiment enables obtaining a smooth high-quality video image. Moreover, this embodiment enables obtaining a different output video signal depending on any of the three parameters.

TABLE 1

| Parameters | Reduced to half | Normal condition | Enlarged to double |
|---|---|---|---|
| α | −1 | −1 | 0 |
| β | 1 | 2 | 4 |
| Th | 6 | 4 | 2 |

Table 1 shows an example of parameter settings in the video signal adjustment technique according to this embodiment. Table 1 also shows α, β, and Th in cases where an image is reduced to half size and is enlarged to double size. As to the overview of a display device, the display device is a color TFT liquid crystal panel with a size of 24.1", a pixel pitch of 0.27×0.27 mm, and a recommended resolution of 1920×1200. As to the filter setting, the filter size is 5×5 and all the filter coefficients are "1." A displayed image has an image type of a static image and the image size of 480×640. Processing was performed on a Y (luminance) component in YUV.

It can be confirmed that only the settings of the three parameters as shown in Table 1 enable displaying a high-quality image in which the sharpening and the smoothing are both achieved. Even though a video image needs an adjustment according to conditions such as a monitor size, a pixel pitch, an enlargement/reduction algorithm, and the like, the adjustment of the video image can be made on the basis of the values as exemplarily shown in Table 1. Since a different output video signal can be obtained depending on any of the three parameters, it is possible to make an adjustment in accordance with the properties (resolution, screen size, and the number of bits in a video image) of a device which displays the video image. Thus, a high-quality video image can be obtained.

Figure 9:
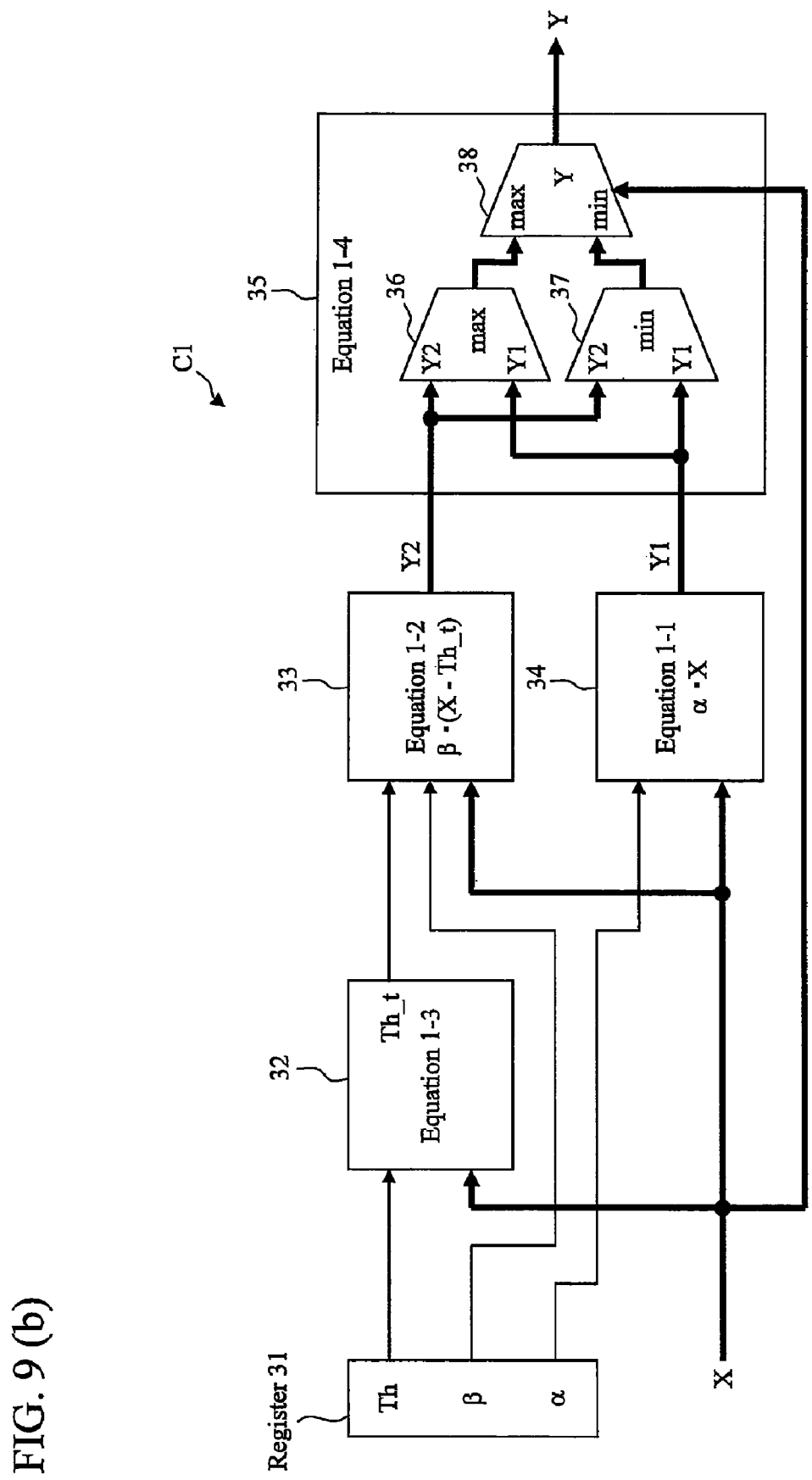
FIG. 9(a) is conversion equations showing a first example of a video signal conversion circuit according to the first embodiment of the present invention.
FIG. 9(b) is a block diagram showing the first example of the video signal conversion circuit according to the first embodiment of the present invention.

FIG. 9(*b*) is a functional block diagram illustrating an example of a video signal conversion circuit according to this embodiment. FIG. 9(*a*) is a diagram showing arithmetic equations used in the functional blocks. A video signal conversion circuit C1 shown in FIG. 9(*b*) includes: a register 31 which stores the values of the threshold Th, β, and α; a circuit 32 for determining the threshold in Equation 1-3; a first arithmetic circuit 33 for computing Equation 1-2; a second arithmetic circuit 34 for computing Equation 1-1; and a third arithmetic circuit 35 for computing Equation 1-4. The third arithmetic circuit 35 includes: a circuit 36 for calculating the maximum value for Y1 and Y2; a circuit 37 for calculating the minimum value for Y1 and Y2; and a circuit 38 for calculating Y on the basis of the outputs and thus outputting Y. An input signal X is inputted into the circuits 32, 33, 34, and 38. Y is outputted from the circuit C1. This configuration enables achievement in a high-quality display based on a video signal while keeping the circuit size small.

Figure 10:
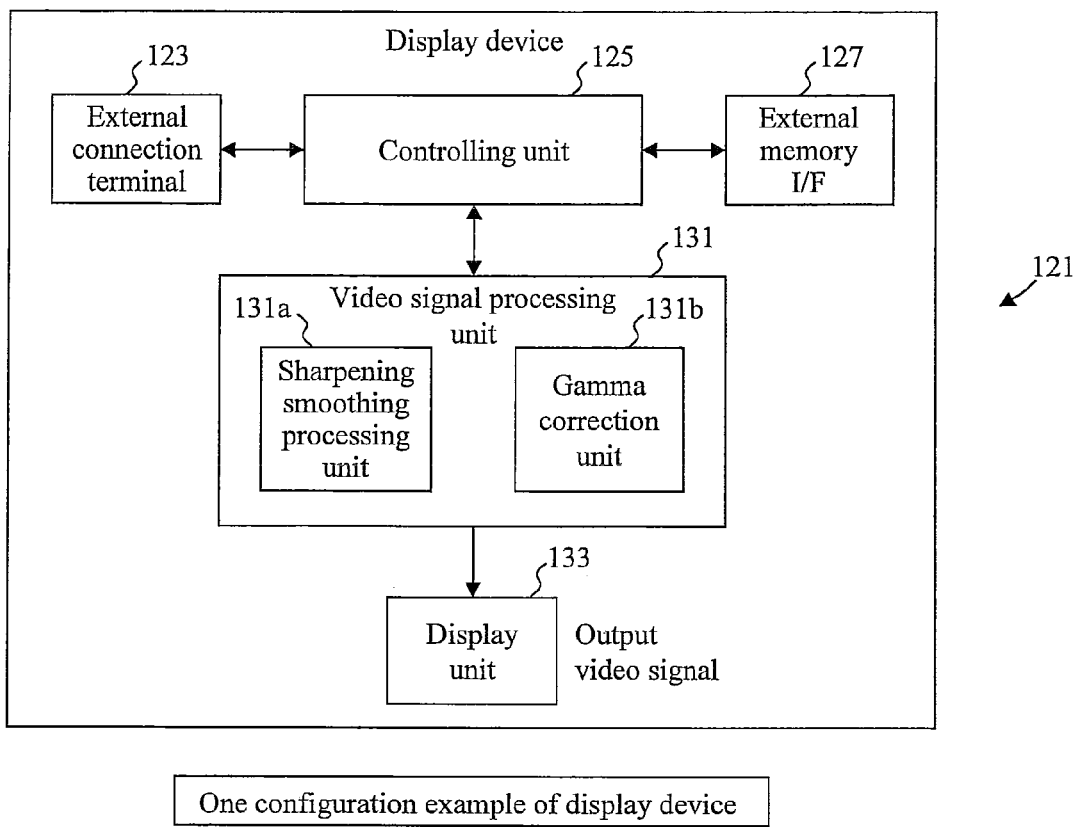
FIG. 10 is a diagram illustrating a configuration example of a display device which includes a video signal processing circuit (sharpening smoothing processing unit) according to this embodiment.

Hereinbelow, an example of application to a specific device employing this sharpening smoothing circuit will be described. FIG. 10 is a diagram illustrating a configuration example of a display device 121 which includes a video signal processing circuit (sharpening smoothing processing unit 131*a*) according to this embodiment. The display device 121 includes an external connection terminal 123, a controlling unit 125, an external memory interface I/F 127, a video signal processing unit 131, and a display unit 133. An input video signal is received by the external connection terminal 123 or the external memory interface I/F 127. On the basis of an instruction from the controlling unit 125, γ correction is made by the video signal processing unit 131 and the signal processing is performed by the aforementioned sharpening smoothing processing unit 131*a*. The output video signal processed in this manner can be outputted to the display unit 133, so that a video image can be displayed.

Figure 11:
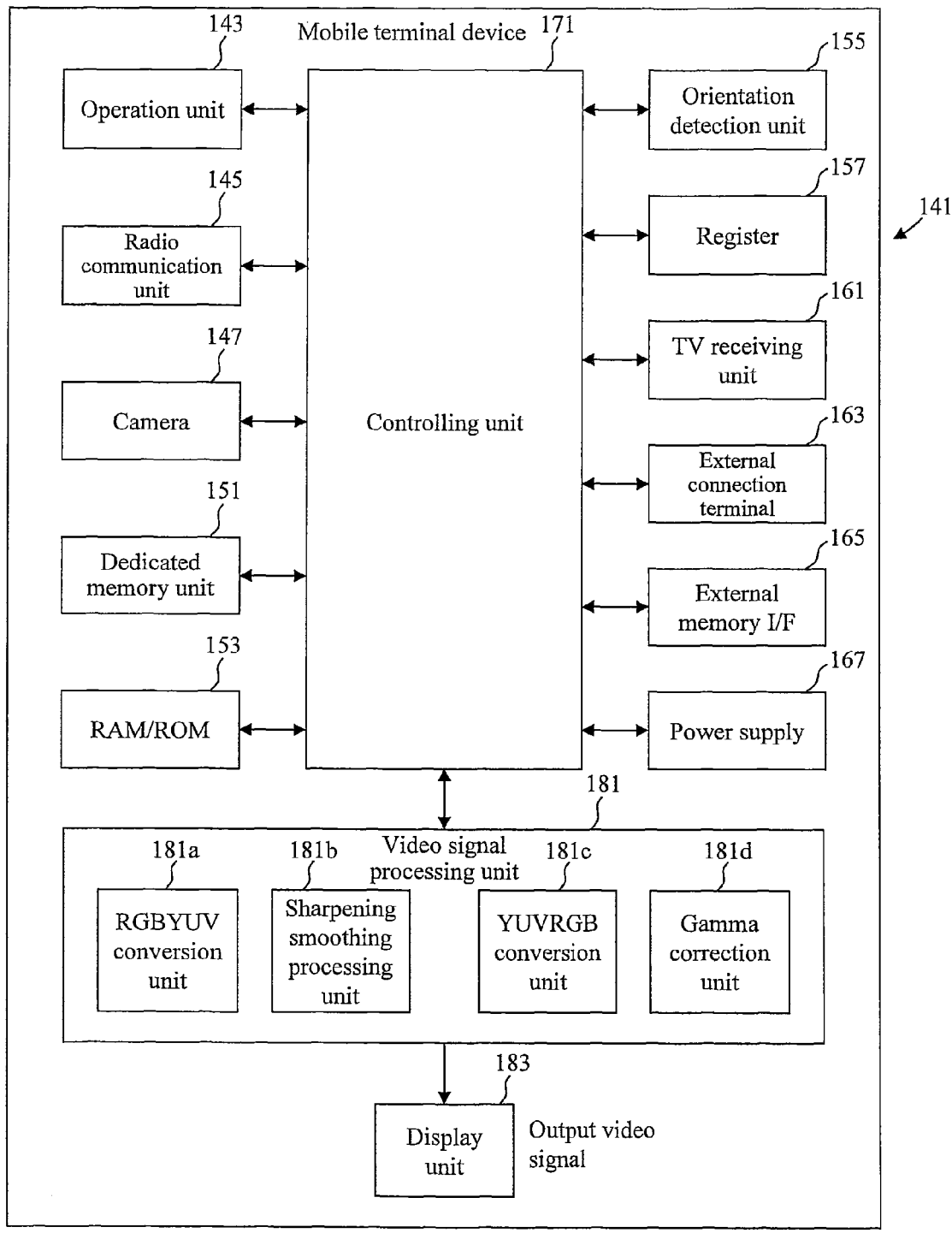
FIG. 11 is a functional block diagram illustrating a configuration example of a mobile terminal device employing a sharpening smoothing circuit according to this embodiment.

FIG. 11 is a functional block diagram illustrating a configuration example of a mobile terminal device 141 employing the sharpening smoothing circuit according to this embodiment. As shown in FIG. 11, the mobile terminal device 141 according to this embodiment includes: an operation unit 143; a radio communication unit 145; a camera 147; a dedicated memory unit 151; a RAM/ROM 153; an orientation detection unit 155 which detects the orientation of a foldable type mobile terminal device, for example; a register 157; a TV receiving unit 161; an external connection terminal 163; an external memory I/F 165; a power supply (battery) 167; controlling unit (CPU) 171; a video signal processing unit 181 which outputs an output video signal; and a display unit 183 which displays a video image according to the outputted video signal.

The video signal processing unit 181 includes: an RGBYUV conversion unit 181*a*; a sharpening smoothing processing unit 181*b*; a YUVRGB conversion unit 181*c*; and a γ correction unit 181*d*. By employing the sharpening smoothing processing unit according to this embodiment in the video signal processing unit 181 of the mobile terminal device 141 in this manner, it is possible to obtain a high-quality video image easily.

Figure 12:
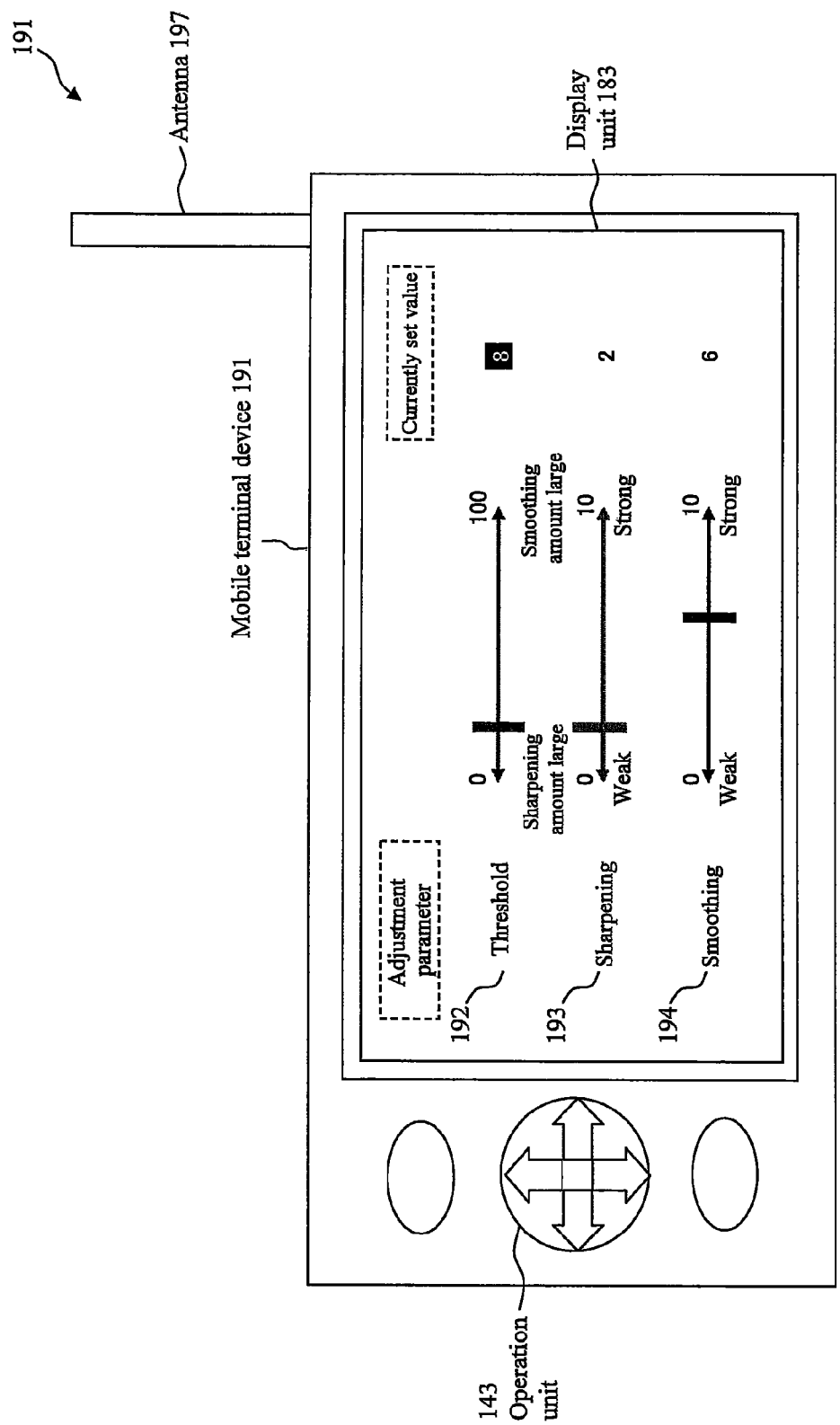
FIG. 12 is a diagram illustrating an example where a user interface which allows changing adjustment parameters in the sharpening smoothing processing unit is displayed on a display unit of the mobile terminal device shown in FIG. 11.

FIG. 12 is a diagram illustrating an example where a user interface which allows changing adjustment parameters in the sharpening smoothing processing unit is displayed on the display unit 183 of the mobile terminal device shown in FIG. 11. A mobile terminal device 191 is provided with a display unit 183, an operation unit 143, and an antenna 197. Set values of three parameters Th (threshold) 192, β (sharpening) 193, and α (smoothing) 194 displayed on the display unit 183 can be changed by use of the operation unit 143 (the figure illustrates a situation where the threshold 192 is being adjusted). The parameters may be adjusted by a manufacturer of the mobile terminal device at the time of the shipment in order to eliminate individual differences, or may be adjusted by a user according to his/her taste. In this respect, a preferable configuration is one which allows the user to check a video image while the adjustment parameters are being changed. For example, a menu display can be displayed on the display unit 183 in a superimposed manner while the video image after the adjustment can be checked in a full-screen display. Moreover, a display unit for a setting purpose may be separately provided.

Figure 13:
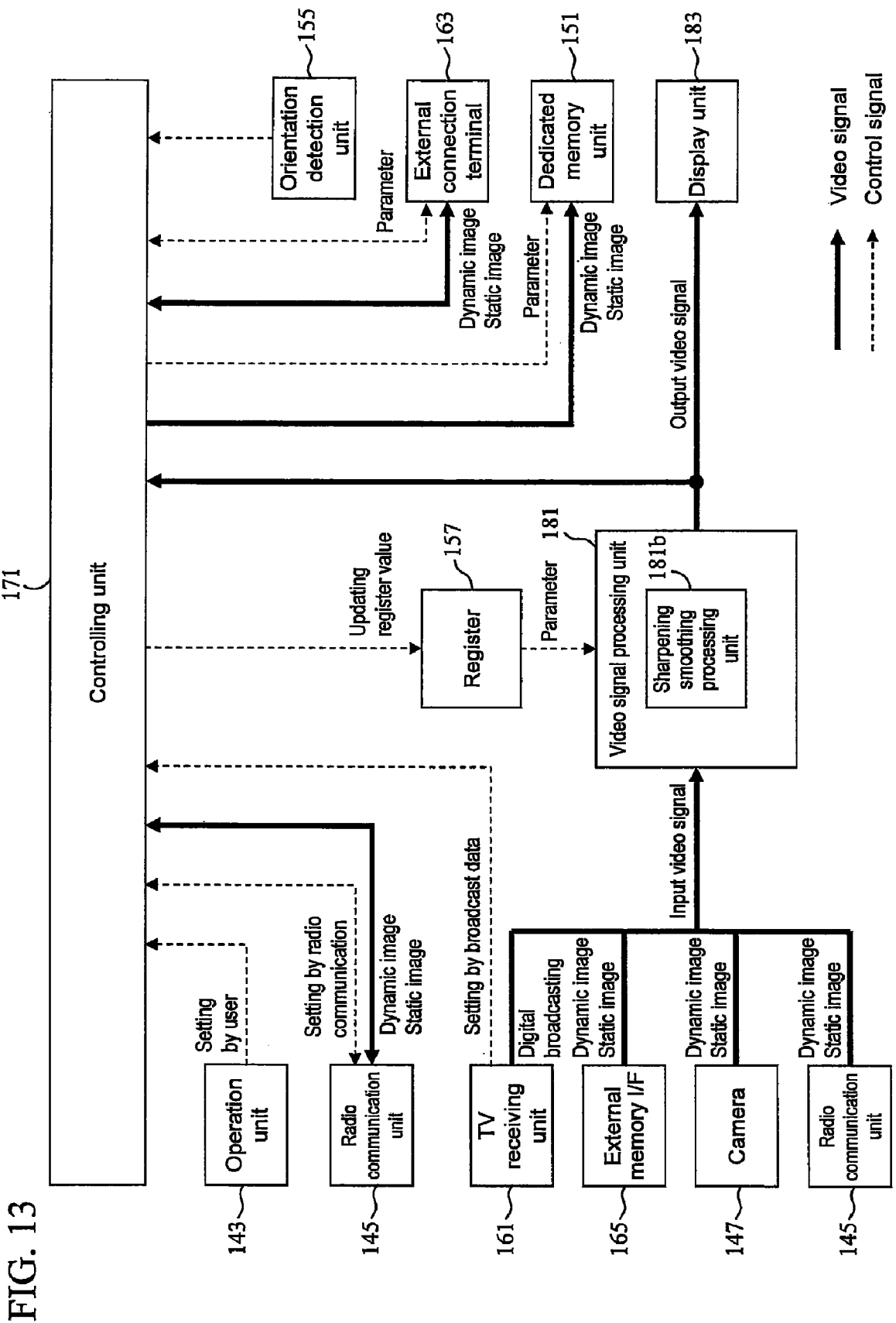
FIG. 13 is a diagram illustrating an example of a scene where the video image processing technique according to this embodiment is used.

FIG. 13 is a diagram illustrating an example of a scene where the video image processing technique according to this embodiment is used. The controlling unit (CPU) 171 performs overall control. Parameters can be set by the user on the operation unit 143. In addition, the parameters can be set from the radio communication unit 145 via a radio communication. It is also possible to control the mobile terminal device according to a detection result from the orientation detection unit 155. For example, the orientation detection unit 155 is capable of detecting whether the display unit of the mobile terminal device provides a portrait display or a landscape display. In addition, parameters can also be set according to broadcast data from the television (TV) receiving unit 161, as will be described later.

An input video signal is obtained from a source such as a dynamic or static image supplied from the radio communication unit 145, the camera 147, and the external memory I/F and a video image of digital broadcasting supplied from the TV receiving unit 161. The sharpening smoothing processing unit 181b of the video signal processing unit 181 performs the sharpening smoothing processing according to this embodiment. The parameters used for this processing are set from the setting units described above, so that the set values which are set in the register 157 via the controlling unit 171 can be updated. The sharpening processing/smoothing processing are performed on the input video image by use of the updated parameters. The output video signal is outputted to the display unit 183, so that the video image can be displayed thereon.

Furthermore, an output video signal can be transmitted to the controlling unit 171, and then this output video signal (dynamic image/static image) can be outputted to the radio communication unit 145, the external connection terminal 163, or the dedicated memory unit 151, such as a hard disk or a memory card. Likewise, the parameter values based on the settings can also be outputted to the radio communication unit 145, the external connection terminal 163, or the dedicated memory unit 151.

Figure 14:
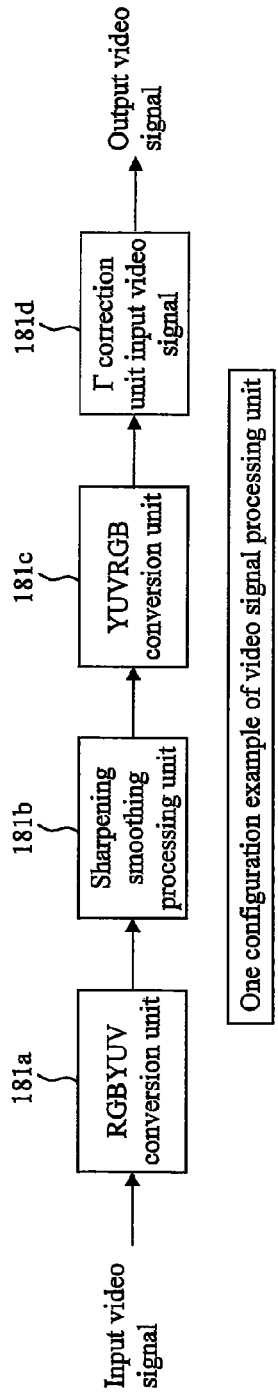
FIG. 14 is a diagram illustrating a processing flow in a video signal processing unit.

FIG. 14 is a diagram illustrating a processing flow in the video signal processing unit. As shown in FIG. 14, firstly, an input video signal is inputted into the RGBYUV conversion unit 181a; the sharpening smoothing processing unit 181b then performs conversion processing according to this embodiment on the signal; the YUVRGB conversion unit 181c then performs conversion on the signal; the gamma correction unit 181d then performs a gamma correction on the signal; and thus an output video signal is outputted.

Figure 15:
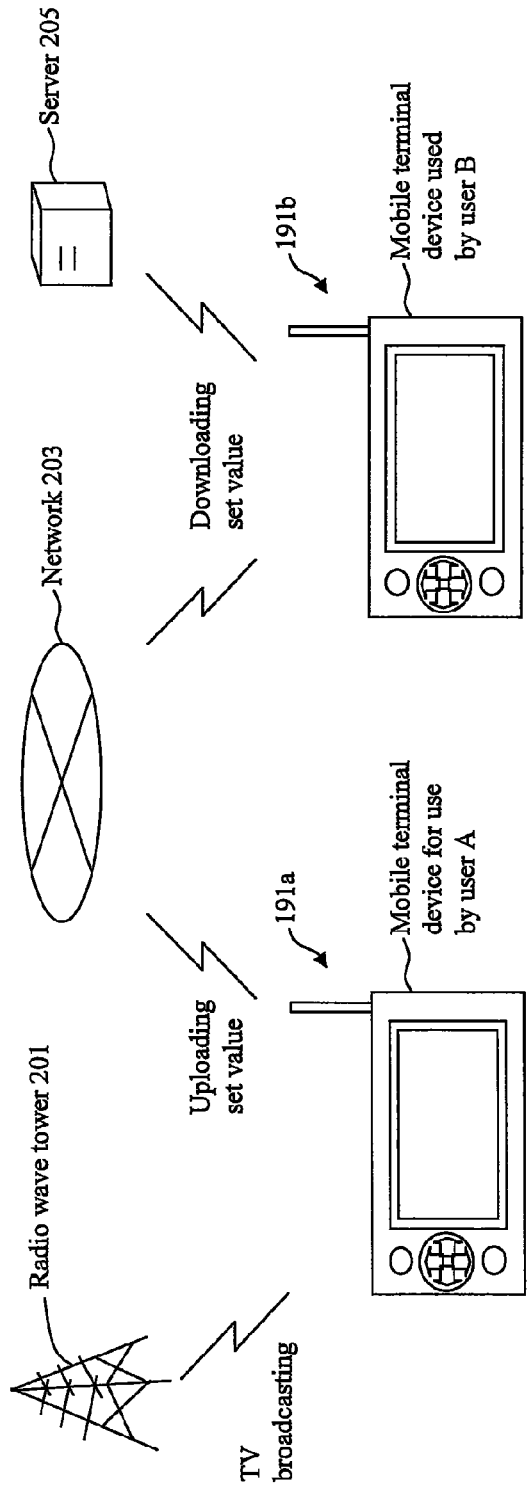
FIG. 15 is a diagram illustrating an example of an application scene where set values are transmitted or received.

FIG. 15 is a diagram illustrating an example of an application scene where set values are transmitted or received. For example, set values on a mobile terminal device 191a used by a user A may be directly transmitted via a network 203 to a mobile terminal device 191b used by a user B. The set values includes: set values which are transmitted as parameters according to transmission of an image on a TV phone; set values which are obtained by a user's adjustment in a way the set values match the television (TV) broadcasting which is broadcast by a radio wave tower 201 and which the user is viewing; and other values. By communicating such set values, users can share the same adjustment values. It is also possible to transmit or receive the image itself on the TV phone, the image obtained by conversion by use of the adjusted parameters. Note that set values may be assigned to a content (program) itself of the television broadcasting. A video content which is assigned set values may be made downloadable via a server 205. In this case as well, the set values which match a dynamic image content should be obtained together with the content, so that adjustment values which match the video content can be set in the register. In the manner as described above, when contents are to be obtained in various modes, obtaining set values of the parameters which match the contents together with the contents makes it possible to perform sharpening smoothing processing by use of the parameters suitable to the contents.

FIG. 16 is a diagram illustrating an example of a display related to enlargement/reduction of a displayed video image. The reference symbol 197 denotes an antenna for TV reception. When there is a setting according to broadcast data which matches this video image or when there is a setting shared by users, the video image can be displayed on the basis of such a setting. Even when there is no such setting, the video image can be easily adjusted according to user's taste as long as the user I/F as described above is prepared.

For example, a video image received by a television of the mobile terminal device 191 is denoted by D1. In order to display a TV video image within a video display area D2, the TV video image needs to be reduced in size, as in a case shown in D2 where the TV video image is to be displayed in a portrait screen mode, on the display unit 183 of the mobile terminal device 191 and where the video display area D2 has the smaller resolution than the received video image D1 does. On the other hand, in order to display a TV video image on the entire display unit, the TV video image needs to be enlarged in size, as in a case shown in D3 where the TV video image is to be displayed in a landscape screen mode and where a video display area D3 has the larger resolution than the received video image D1 does. In the case of enlargement, the display quality can be improved by decreasing the ratio of data to be smoothed and increasing the ratio of data to be sharpened. On the other hand, in the case of size reduction, an eye-friendly display which is not so strong can be obtained with such an adjustment that the ratio of data to be smoothed is increased and the ratio of data to be sharpened is decreased.

Note that the operation includes not only a simple key operation on the operation unit 143 by the user but also the changing of the orientation of a casing (for example, a rotational operation of the display unit, and the like), and also includes an automatic operation by detecting the orientation at the time. For example, the orientation detection unit 155 shown in FIG. 13 or the like can detect the orientation. In this case, a controlling unit (not shown) judges, by use of the orientation detection unit, whether the display is on the portrait screen display mode or the landscape screen display mode, and updates the set values in the register as needed.

Figure 17:
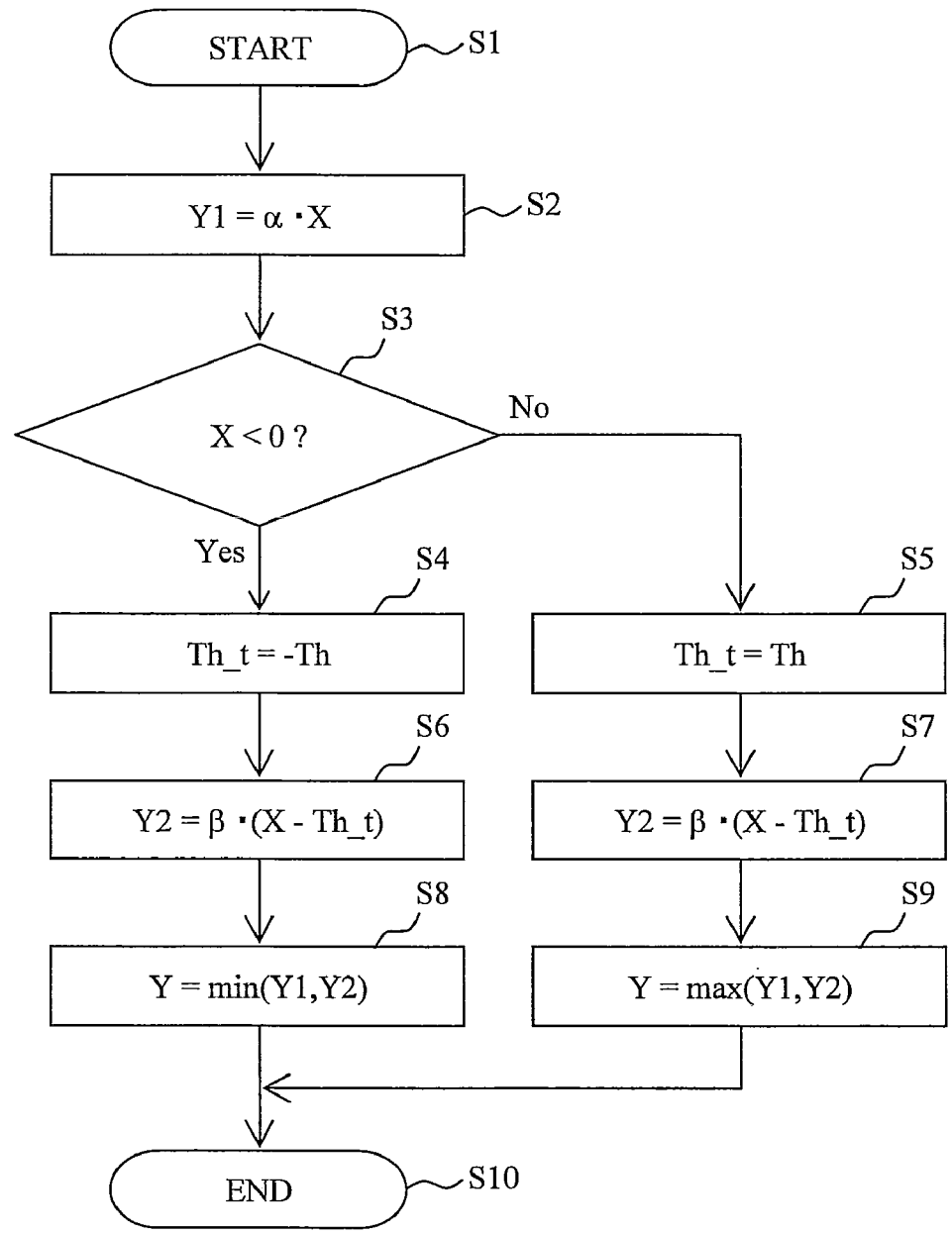
FIG. 17 is a flowchart illustrating a first processing flow at the time when the sharpening smoothing processing according to this embodiment is performed by software processing.

FIG. 17 is a flowchart illustrating a flow of the sharpening processing/smoothing processing according to this embodiment. Firstly, processing starts (START) as shown in Step S1, and then an arithmetic operation of $Y1=\alpha \cdot X$ is performed in Step S2. Subsequently, in Step S3, it is determined whether X is positive or negative. If negative (Yes), the processing proceeds to Step S4, whereas if positive (No), the processing proceeds to Step S5. In Step S4, Th_t is set to −Th. In Step S5, Th_t is set to Th. Then, in each of Steps S6 and S7, $Y2=\beta \cdot (X-Th\_t)$ is calculated. Further, $Y=\min(Y1,Y2)$ is calculated in Step S8, $Y=\max(Y1,Y2)$ is calculated in Step S9, and then the processing ends (Step S10). In this manner, the sharpening smoothing processing as shown in FIG. 2 can be performed by software processing.

As has been described, this embodiment makes the sharpening smoothing processing easy by setting a coefficient of the first function as the smoothing parameter ($\alpha$) and by setting a coefficient of the second function as the sharpening parameter ($\beta$), the first function being defined as a function passing the origin, the second function being defined as a function passing the threshold Th.

Moreover, it is possible to obtain a different output video signal depending on any of the three parameters, so that high-quality video image can be obtained even when the image is enlarged or reduced in size (e.g., portrait display or landscape display of TV broadcasting).

Next, a video processing technique according to a second embodiment of the present invention will be described with reference to the drawings.

FIG. 18 is a diagram illustrating the principle of the video image processing technique according to this embodiment and is a drawing for X-Y conversion. As shown in FIG. 18, a function for smoothing (noise elimination) is expressed by a quadratic curve $Y1=\alpha\_t \cdot X \cdot (X-Th\_t)$ passing the origin and the thresholds Th and −Th while a function for sharpening is expressed by a straight line Y2=β(·X−Th_t) passing the thresholds Th and −Th. The use of this approach is advantageous in that the change in the image becomes further smoother although the circuit size and the workload become larger than those in the first embodiment.

Figure 19:
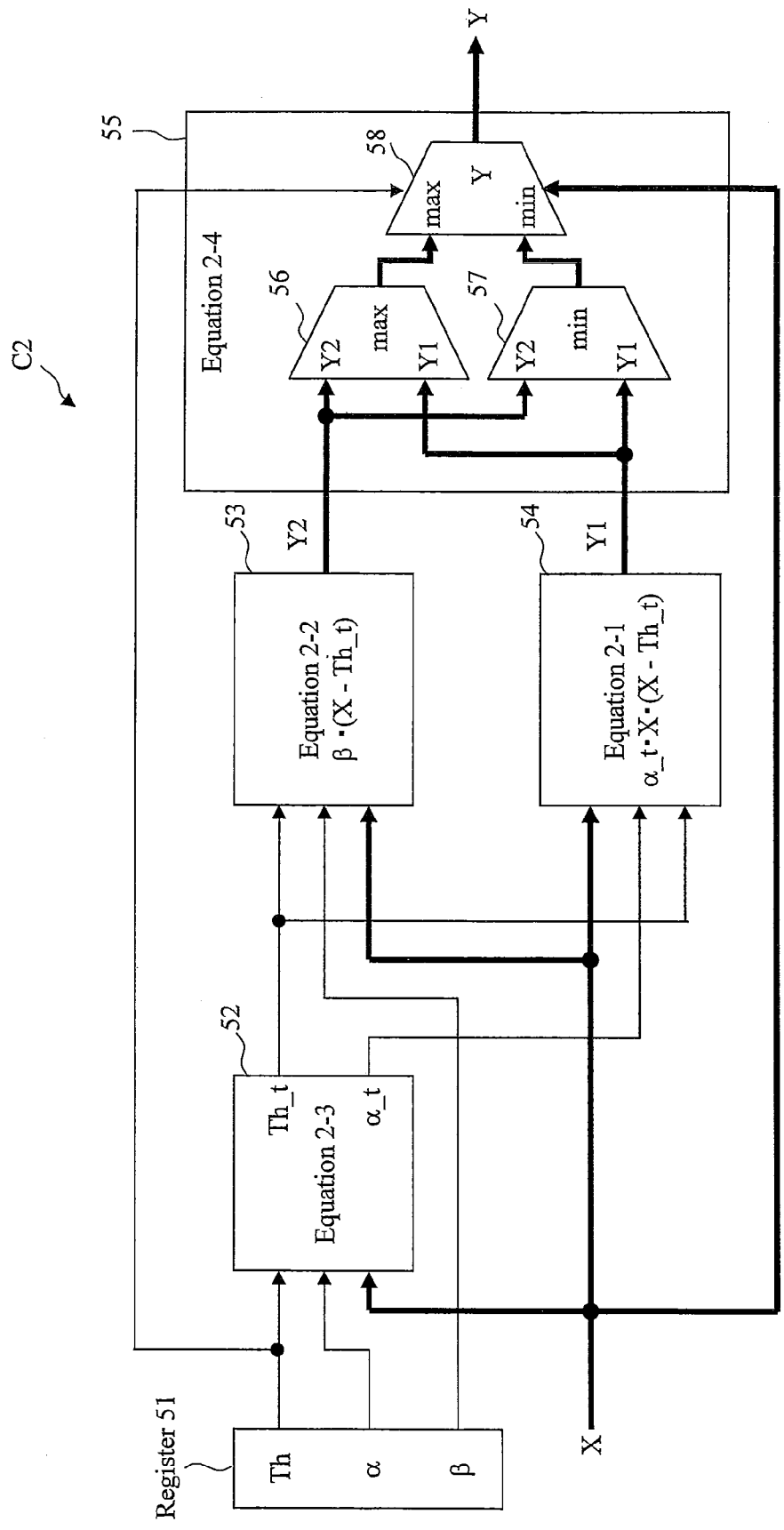
FIG. 19(a) is conversion equations showing a second example of a video signal conversion circuit according to the first embodiment of the present invention.
FIG. 19(b) is a block diagram (b) showing the second example of the video signal conversion circuit according to the second embodiment of the present invention.

FIG. 19 is a functional block diagram illustrating an example of a video signal conversion circuit according to this embodiment. FIG. 19(a) shows arithmetic equations used in the functional blocks. A video signal conversion circuit C2 shown in FIG. 19(b) includes: a register 51 which stores the values of the threshold Th, β, and α; a circuit 52 for determining the threshold and α in Equation 2-3; a first arithmetic circuit 53 for computing Equation 2-2; a second arithmetic circuit 54 for computing Equation 2-1; and a third arithmetic circuit 55 for computing Equation 2-4. The third arithmetic circuit 55 includes: a circuit 56 for calculating the maximum value for Y1 and Y2; a circuit 57 for calculating the minimum value for Y1 and Y2; and a circuit 58 for calculating Y on the basis of the outputs and thus outputting Y. An input signal X is inputted into the circuits 52, 53, 54, and 58. Y is outputted from the circuit C2. This configuration enables achievement in a higher-quality display based on a video signal while keeping the circuit size small.

Figure 20:
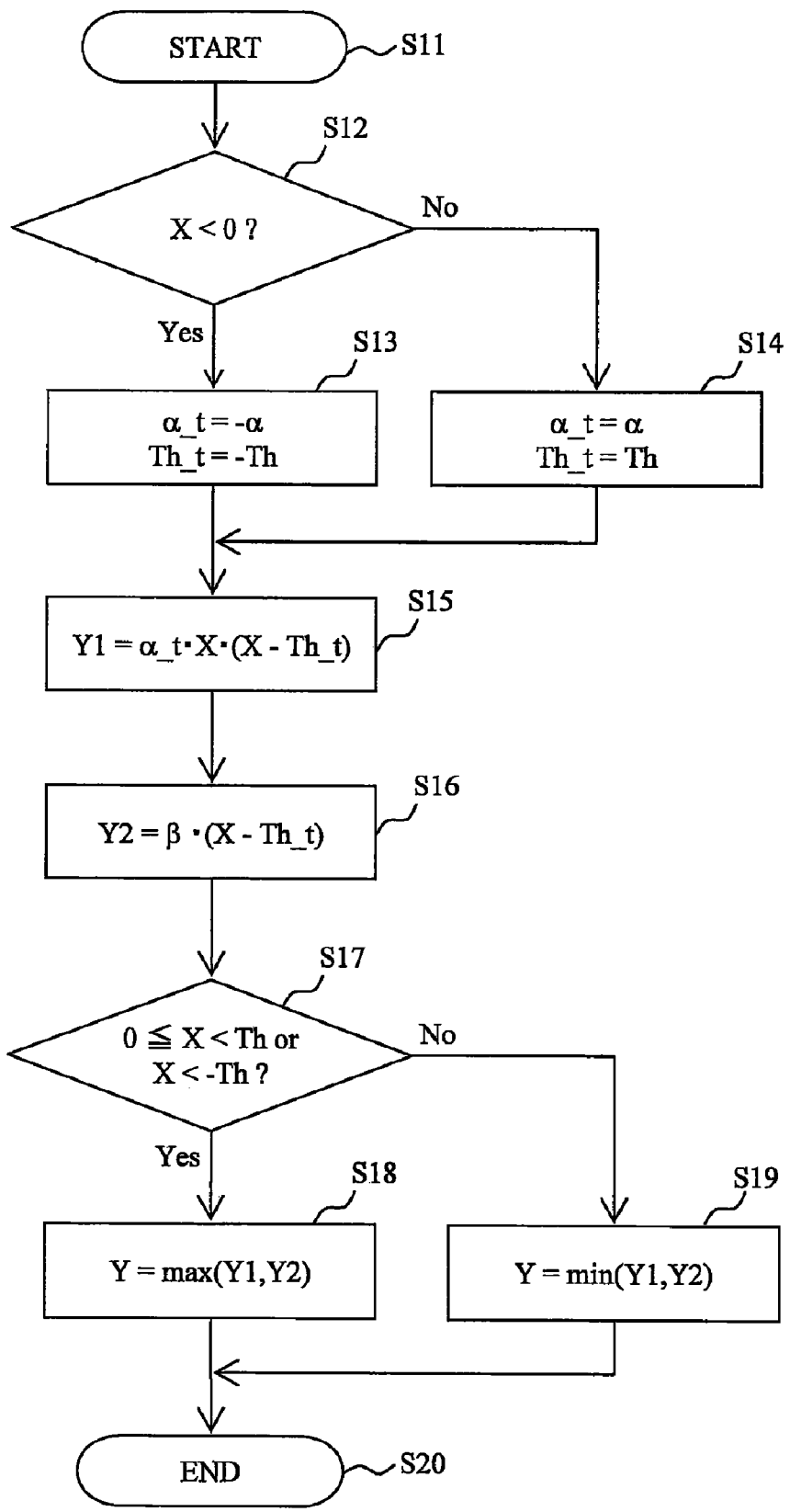
FIG. 20 is a flowchart illustrating a second processing flow at the time when the sharpening smoothing processing according to this embodiment is performed by software processing.

FIG. 20 is a flowchart illustrating a processing flow for performing the processing according to this embodiment by software processing. Firstly, processing starts (START) as shown in Step S11, and then in Step S12, it is determined whether X is positive or negative. If negative (Yes), the processing proceeds to Step S13, whereas if positive (No), the processing proceeds to Step S14. In Step S13, α_t is set to −α and Th_t is set to −Th. In Step S14, α_t is set to α and Th_t is set to Th. Then in Step S15, Y1=α_t·X·(X−Th_t) is calculated. Further in Step S16, Y2=β·(X−Th_t) is calculated. In Step 17, the condition of X is judged. If Yes, Y=max (Y1, Y2) is calculated in Step S18, whereas if No, Y=min (Y1, Y2) is calculated in Step S19. Then, the processing ends (Step S20). In this manner, the sharpening smoothing processing can be performed by the software processing.

As has been described, this embodiment makes the sharpening smoothing processing easy by setting as the smoothing parameter (α) a coefficient of a quadratic curve which is a first function and by setting as the sharpening parameter (β) the inclination of a straight line which is a second function, the first function being defined as a function passing the origin, the second function being defined as a function passing the threshold Th.

Moreover, it is possible to obtain a different output video signal depending on any of the three parameters, so that high-quality video image can be obtained even when the image is enlarged or reduced in size (e.g., portrait display or landscape display of TV broadcasting). This configuration enables achievement in a higher-quality display based on a video signal while keeping the circuit size small.

Next, a video processing technique according to a third embodiment of the present invention will be described with reference to the drawings.

FIG. 21 is a drawing illustrating the principle of the video image processing technique according to this embodiment and is a drawing for X-Y conversion. As shown in FIG. 21, a function for smoothing (noise elimination) is expressed by a cubic curve Y1=α·X·(X−Th_t)·(X+Th_t) passing the origin and thresholds Th and −Th while a function for sharpening is expressed by a straight line Y2=β·(X−Th_t) passing the thresholds Th and −Th. The use of this approach is advantageous in that the change in the image becomes further smoother as in the second embodiment although the circuit size and the workload become larger than those in the first embodiment.

Figure 22:
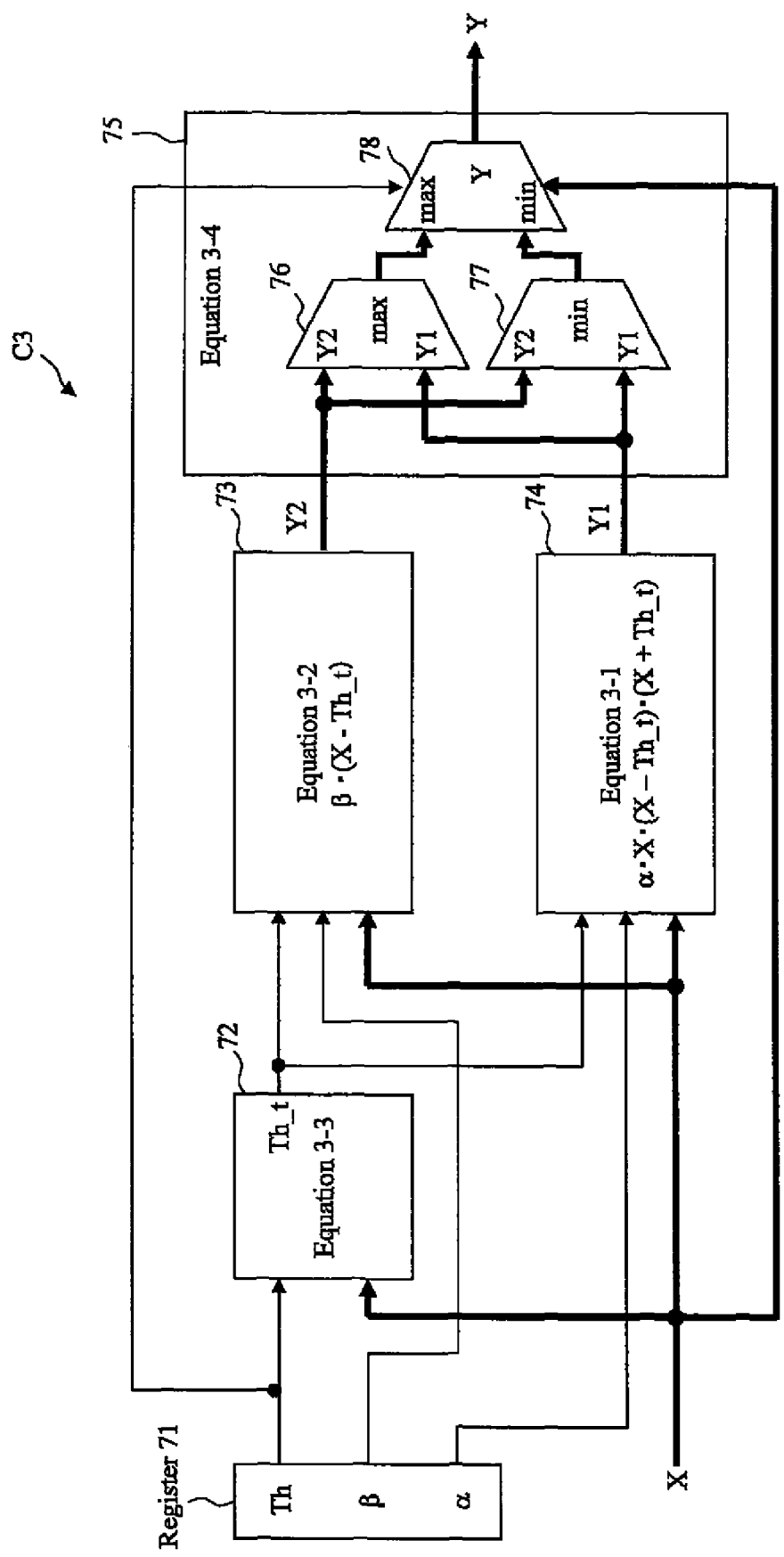
FIG. 22(a) is conversion equations showing a third example of a video signal conversion circuit according to the third embodiment of the present invention.
FIG. 22(b) is a block diagram showing the third example of the video signal conversion circuit according to the third embodiment of the present invention.

FIG. 22 is a functional block diagram illustrating an example of a video signal conversion circuit according to this embodiment. FIG. 22(a) shows arithmetic equations used in the functional blocks. A video signal conversion circuit C3 shown in FIG. 22(b) includes: a register 71 which stores the values of the threshold Th, β, and α; a circuit 72 for calculating the threshold Th_t by Equation 3-3; a first arithmetic circuit 73 for calculating β·(X−Th_t) by Equation 3-2; a second arithmetic circuit 74 for calculating α·X·(X−Th_t)·(X+Th_t) by Equation 3-1; and a third arithmetic circuit 75 for calculating Y based on Equation 3-4. The third arithmetic circuit 75 includes: a circuit 76 for calculating the maximum value for Y1 and Y2; a circuit 77 for calculating the minimum value for Y1 and Y2; and a circuit 78 for calculating Y on the basis of the outputs and thus outputting Y. An input signal X is inputted into the circuits 72, 73, 74, and 78. Y is outputted from the circuit C3. This configuration enables achievement in a higher-quality display based on a video signal while keeping the circuit size small.

Figure 23:
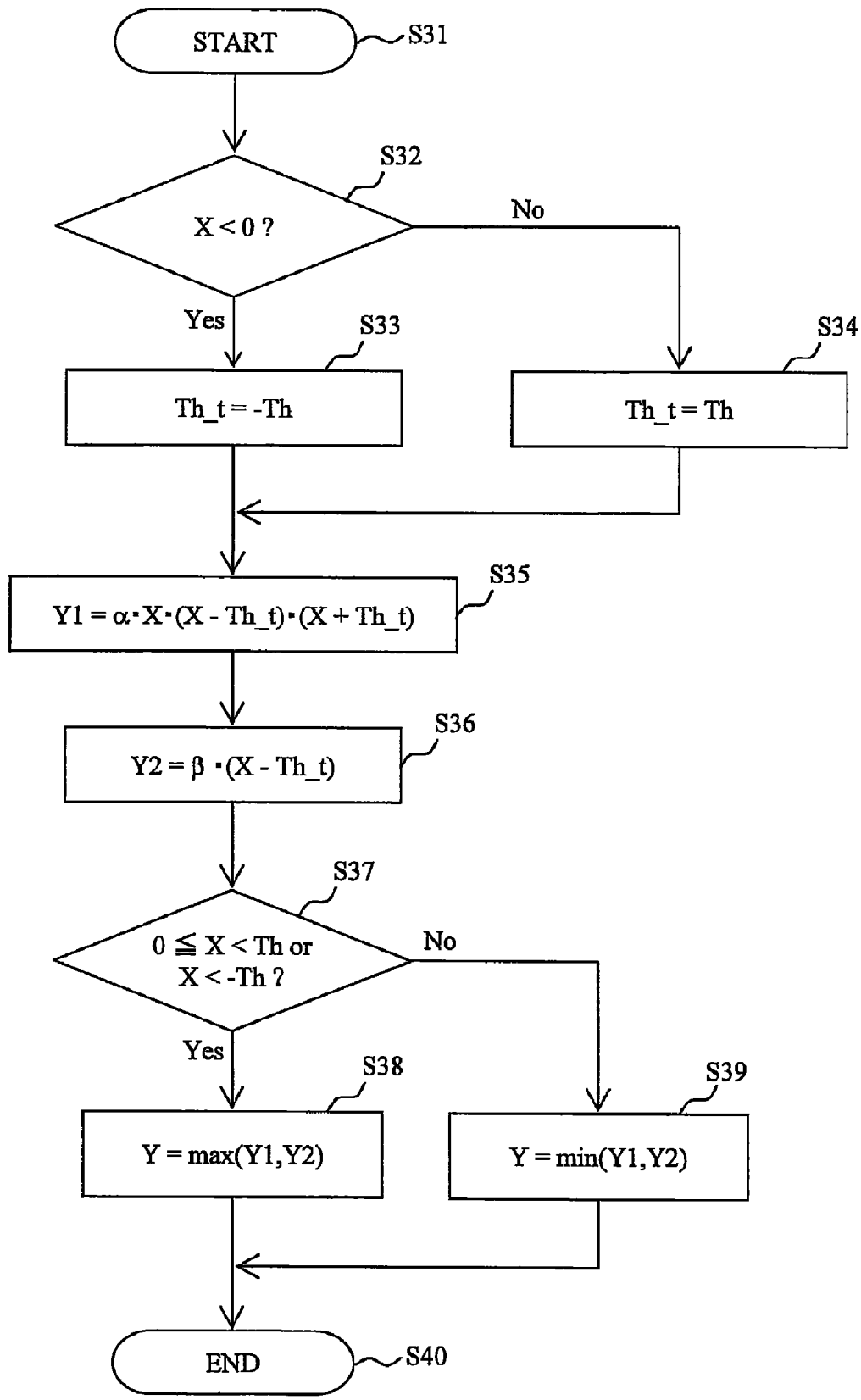
FIG. 23 is a flowchart illustrating a third processing flow at the time when the sharpening smoothing processing according to this embodiment is performed by software processing.

FIG. 23 is a flowchart illustrating a processing flow for performing the processing according to this embodiment by software processing. Firstly, processing starts (START) as shown in Step S31, and then in Step S32, it is determined whether X is positive or negative. If negative (Yes), the processing proceeds to Step S33, whereas if positive (No), the processing proceeds to Step S34. In Step S33, Th_t=−Th. In Step S34, Th_t=Th. Then in Step S35, Y1=α·X·(X−Th_t)·(X+Th_t) is calculated. In Step S36, Y2=β·(X−Th_t) is calculated. In Step 37, the condition of X is judged. If Yes, Y=max (Y1, Y2) is calculated in Step S38, whereas if No, Y=min (Y1, Y2) is calculated in Step S39. Then, the processing ends (Step S40). In this manner, the sharpening smoothing processing can be performed by the software processing.

As has been described, this embodiment makes the sharpening smoothing processing easy by setting as the smoothing parameter (α) a coefficient of a cubic curve which is a first function and by setting as the sharpening parameter (β) the inclination of a straight line which is a second function, the first function being defined as a function passing the origin, the second function being defined as a function passing the threshold Th.

Moreover, it is possible to obtain a different output video signal depending on any of the three parameters, so that high-quality video image can be obtained even when the image is enlarged or reduced in size (e.g., portrait display or landscape display of TV broadcasting). This configuration enables achievement in a higher-quality display based on a video signal while keeping the circuit size small.

Figure 41:
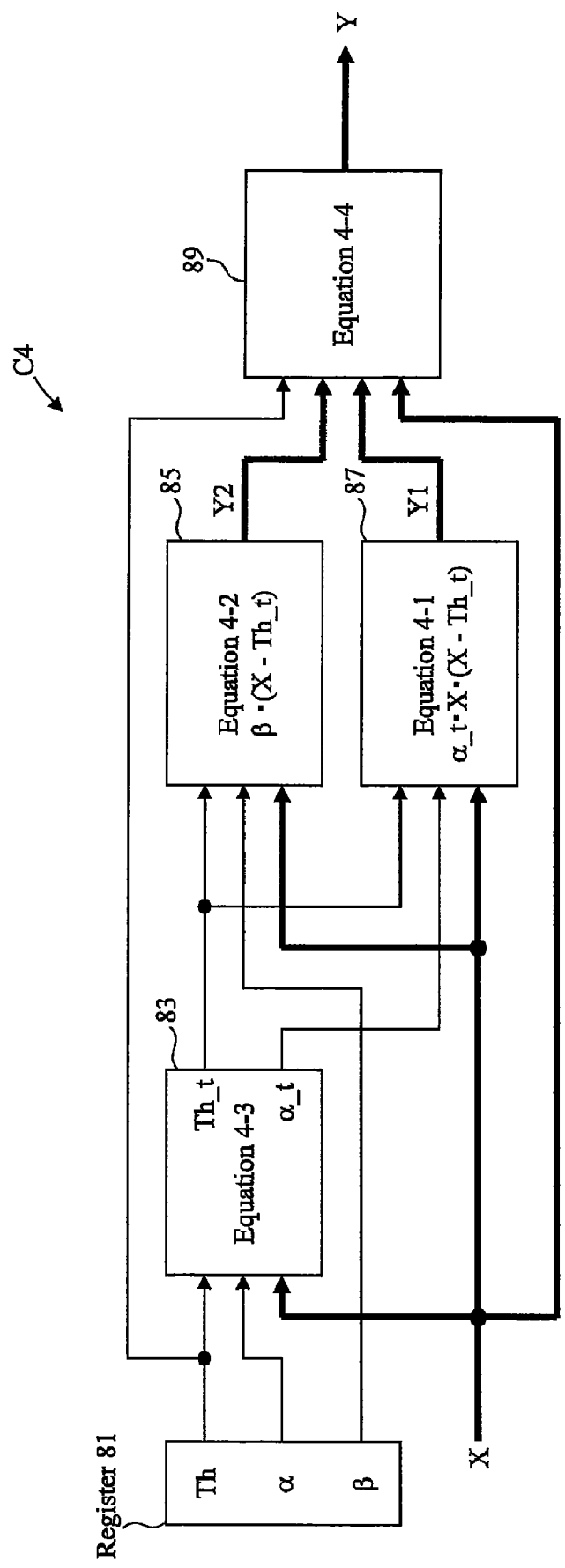
FIG. 41($a$) is conversion equations showing an example where a change is made from FIG. 19($a$) illustrating the second example of the video signal conversion circuit according to the second embodiment of the present invention.
Figure 42:
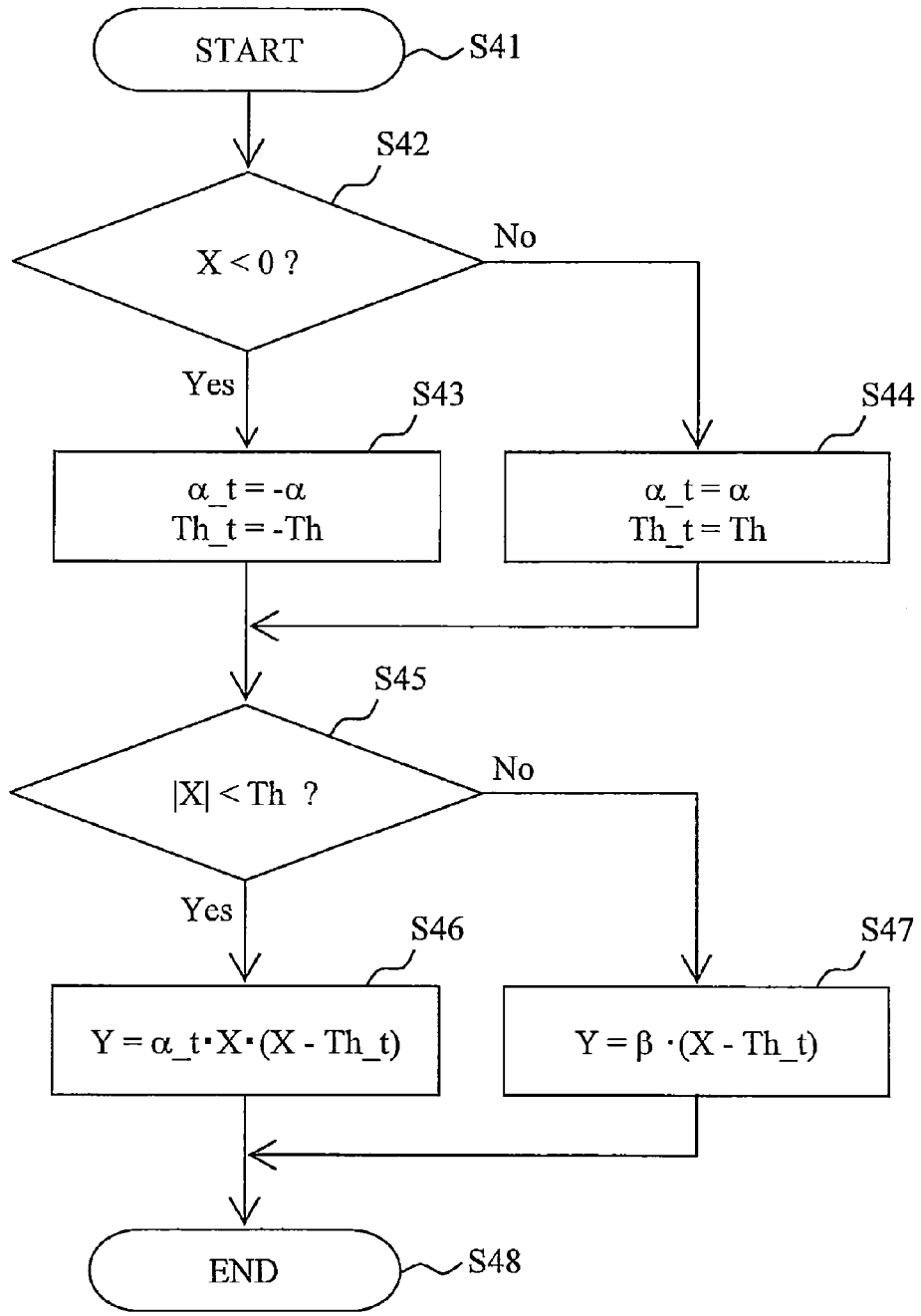
FIG. 42 is a flowchart illustrating a fourth processing flow at the time when the sharpening smoothing processing according to this embodiment is performed by software processing.
Figures 43, 44:
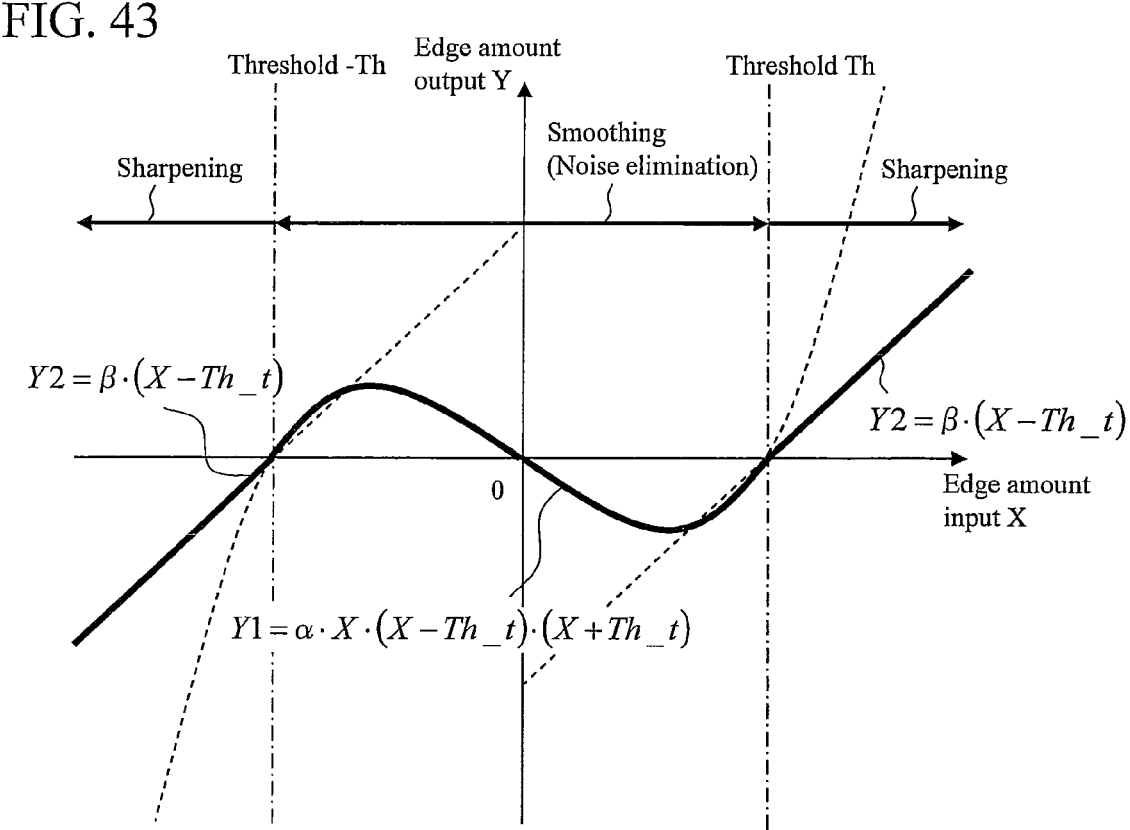
FIG. 43 is a diagram illustrating an example where a conversion is changed from that in FIG. 21 which is the diagram the overview of the video signal adjustment technique according to the third embodiment of the present invention.
FIG. 44($a$) is conversion equations showing an example where a change is made from FIG. 22($a$) illustrating the third example of the video signal conversion circuit according to the third embodiment of the present invention.
Figure 44:
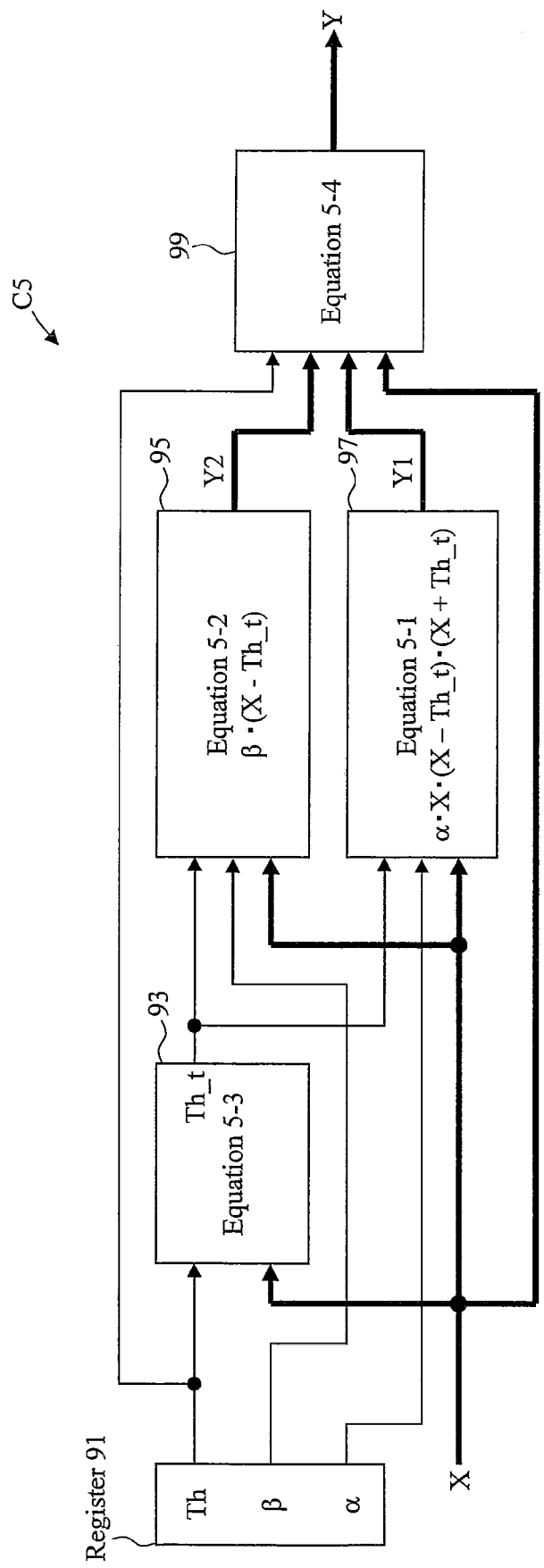
Figure 45:
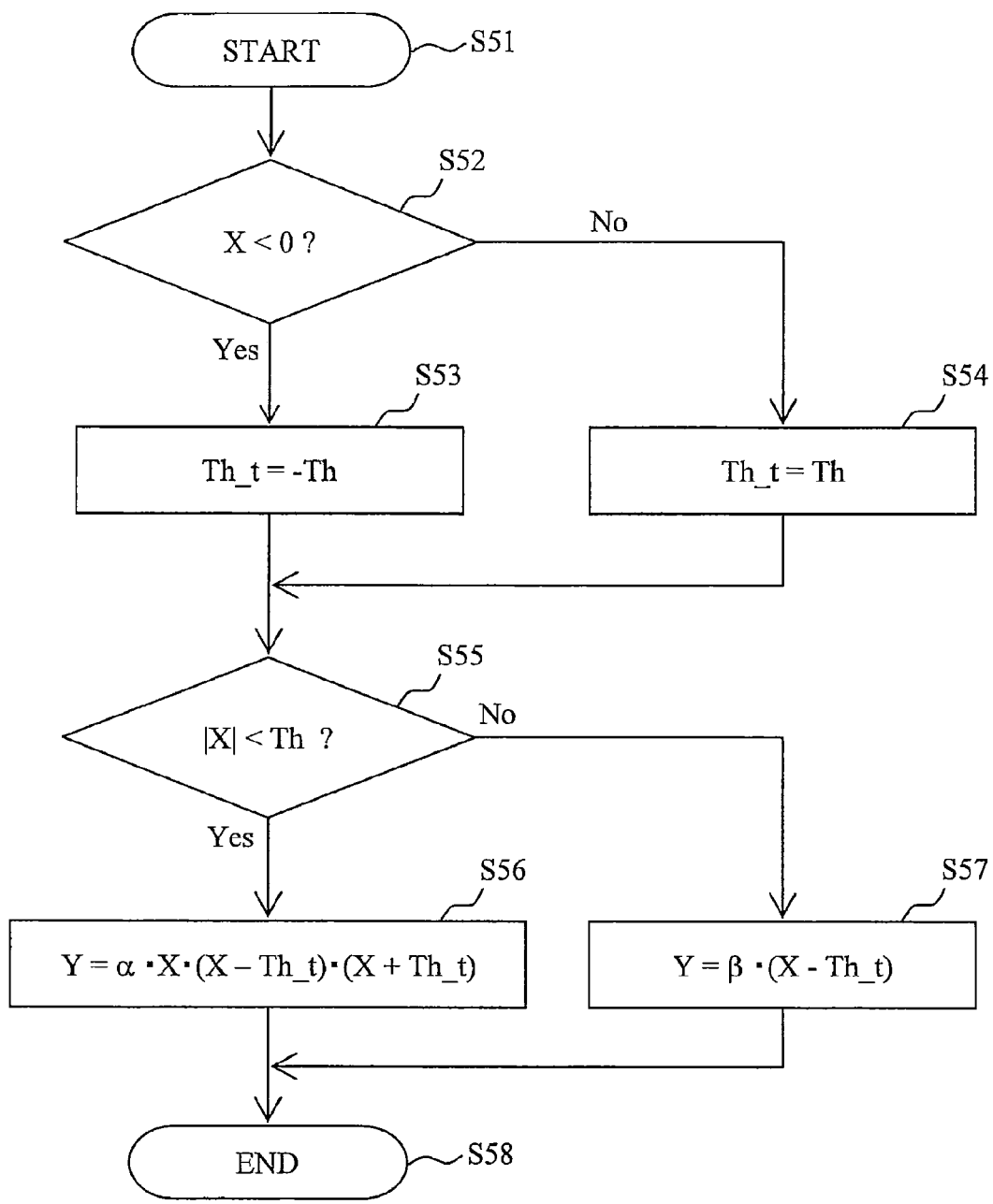
FIG. 45 is a flowchart illustrating a fifth processing flow at the time when the sharpening smoothing processing according to this embodiment is performed by software processing.

Furthermore, an n-th degree (n is an integer of 4 or greater) curve may be used. In this respect, the straight line, the quadratic curve, and the like do not have to be an exact curve, and the intersections with the X axis and the like do not have to exactly match the origin or the threshold. Further, if it is desired to make the arithmetic circuit denoted by 55 in FIG. 19(b) simpler, for example, this can be made possible as long as the switching between the smoothing processing and the sharpening processing is surely made at the threshold. Equations as shown in FIG. 41(a) may be used for the arithmetic equations in this case. Here, the input-output characteristics are expressed as shown in FIG. 40. FIG. 41(b) is a functional block diagram illustrating an example of a video signal conversion circuit and FIG. 42 is a flowchart illustrating a processing flow for performing processing by software processing. Further, for example, if it is desired to make the arithmetic circuit denoted by 75 in FIG. 22(*b*) simpler, for example, this can be similarly made possible as long as the switching between the smoothing processing and the sharpening processing is surely made at the threshold. Equations as shown in FIG. 44(*a*) may be used for the arithmetic equations in this case. Here, the input-output characteristics are expressed as shown in FIG. 43. FIG. 44(*b*) is a functional block diagram illustrating an example of a video signal conversion circuit and FIG. 45 is a flowchart illustrating a processing flow for performing processing by software processing. Moreover, different values may be used as the parameters ($\alpha$, $\beta$, and Th) in the processing for cases of the respective positive and the negative ranges of X, i.e., parameters ($\alpha 1$, $\beta 1$, and Th1) for use in the positive range of X and parameters ($\alpha 2$, $\beta 2$, and Th2) for use in the negative range of X. In addition, for example, the threshold parameter does not have to be a parameter but may be a fixed value. In this case, the circuit size can be made further smaller. That is, it is only necessary that at least one of the three parameters is variable.

(Example of Result of Video Image Processing According to this Embodiment)

Figure 30:
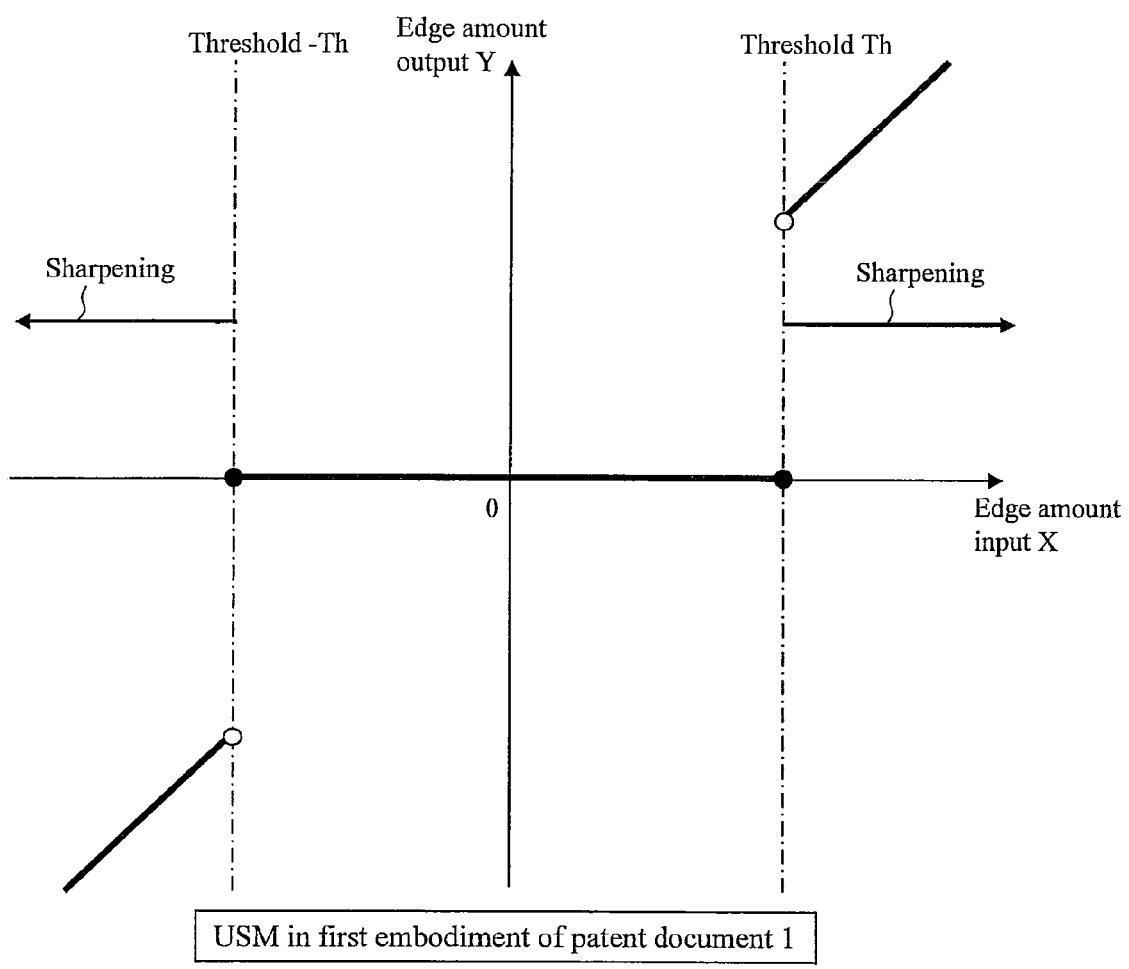
FIG. 30 is a diagram illustrating a relationship between an edge amount input (X axis) and an edge amount output (Y axis) in sharpening processing which is described in a first embodiment of Patent Document 1.

Hereinbelow, a description is given of an example of comparison between a video image processing based on FIG. 2 and a video image processing result based on FIG. 30. Hereinbelow, the description is given by taking, as an example, the case where the filter size is 3×3 and all the filter coefficients are 1. However, the filter size may be set to 5×5, or 7×7, or the filter coefficients may be set to be different from one another. In addition, the description is given also by taking, as an example, the case where processing is performed on a Y (luminance) component in YUV data. However, the processing can be performed in the same manner on data such as Y of YCbCr, YPbPr, and YIQ, L of L*u*v* and L*a*b*, and RGB.

FIG. 24 is a schematic diagram illustrating ranges on the X axis based on the first embodiment of the present invention (Part a) and on the video image processing technique according to the first embodiment of Patent Document 1 (Part b). In the conventional video image processing, the threshold Th is used as a border to divide the range into an area where sharpening is performed and an area where sharpening is not performed. On the other hand, in the video image processing according to this embodiment, smoothing processing is performed in a range on the edge amount input X axis from X=0 to the intersection of Y1 and Y2 where Y1 indicates the smoothing processing characteristic while Y2 indicates the sharpening processing characteristic; sharpening processing is performed in a range on the X axis where the absolute value of X is larger than the threshold Th; and intermediate processing between the smoothing processing and the sharpening processing is performed in middle areas each between the ranges.

Figure 25:
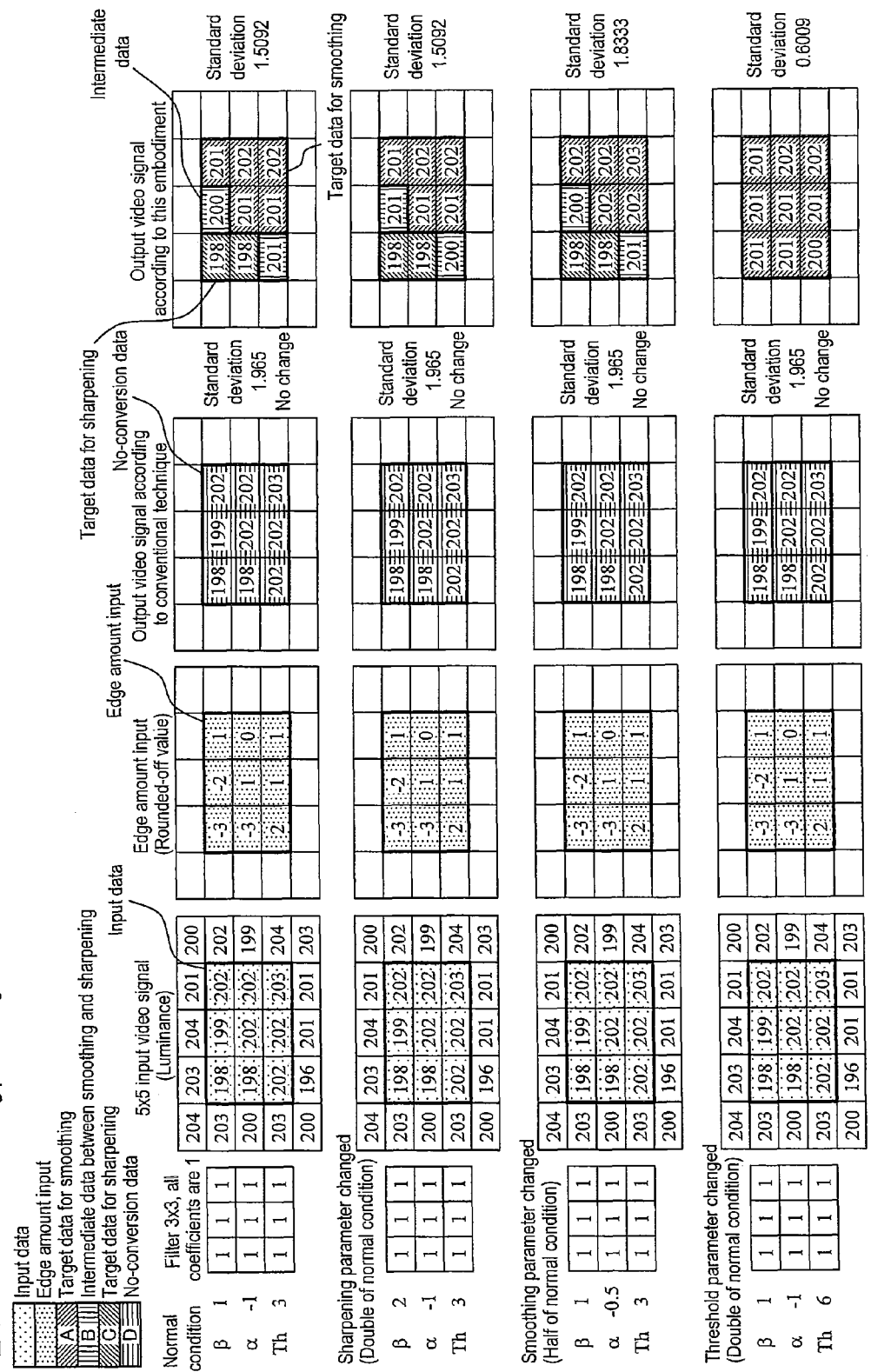
FIG. 25 is a diagram in which smoothing processing results are compared between the video image processing technique according to this embodiment and the conventional technique, by illustrating examples.

FIG. 25 is a diagram in which smoothing processing results are compared between the video image processing technique according to this embodiment and the conventional technique, by illustrating examples. In order from the top, illustrated are examples of: a case where the parameters are set as $\beta=1$, $\alpha=-1$, and Th=3; a case where the parameters are set as $\beta=2$ (double), $\alpha=-1$, and Th=3; a case where the parameters are set as $\beta=1$, $\alpha=-0.5$ (half), and Th=3; and a case where the parameters are set as $\beta=1$, $\alpha=-1$, and Th=6 (double). In order from the left, illustrated are diagrams illustrating examples of: input video signals (luminance) in 5×5; edge amount inputs (rounded-off value); output video signals according to the conventional technique; and output video signals according to this embodiment. A Standard deviation of luminance in each plane is shown on the right side. It is found that since some of data pieces were smoothed, the standard deviations were smaller and the images were smoother and had a higher quality than those according to the conventional technique. Moreover, even in the case where the sharpening parameter was doubled, the standard deviation had no change from the normal condition as in the case where the sharpening parameter was not doubled since there was no sharpening data piece. For this reason, the image was smoother and had a higher quality than those according to the conventional technique. Meanwhile, in the case where a was halved, the standard deviation had been changed (increased) from the normal condition since the parameter indicating the smoothing strength was changed to be weakened. Nevertheless, it is found that the image was smoother and had a higher quality than those according to the conventional technique.

Furthermore, even in the case where the threshold was changed, it is found that the standard deviation was the smallest, the smoothing effect (noise elimination effect) was the highest, and the image was of a high quality. This is because a range in which an input is regarded as a noise is increased, so that all the data pieces consequently fall within the range where the input is regarded as a noise. Since the border at which to switch from the smoothing to the sharpening is continued, each parameter can be changed independently. Such a conversion is not allowed in the fourth embodiment of Patent Document 1. In addition, although the conventional technique involves no variation between the output results, this embodiment involves variations between the output data pieces. Accordingly, this embodiment is capable of exerting various smoothing effects, and thus achieving a higher quality image.

Figure 26:
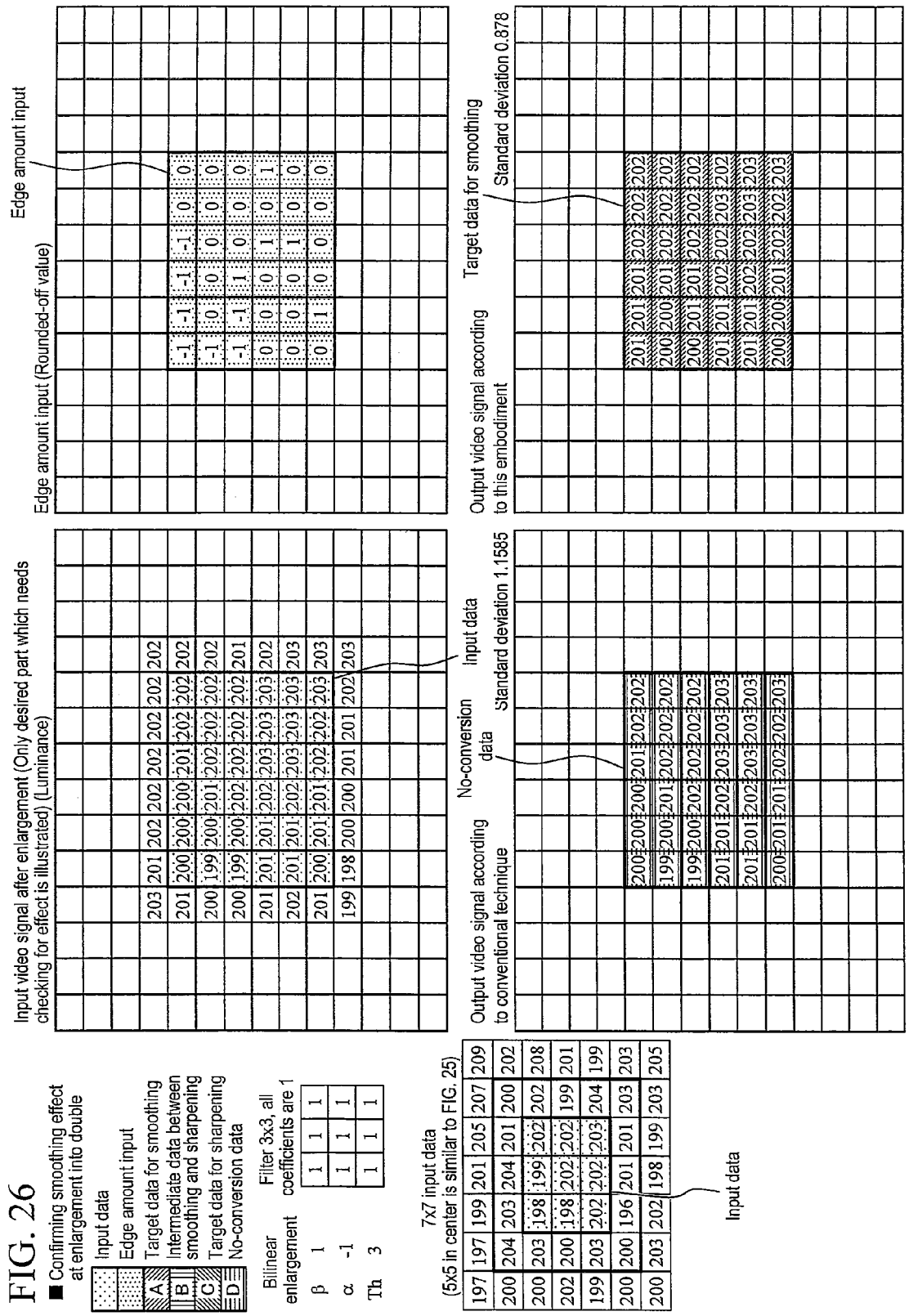
FIG. 26 is a diagram in which smoothing processing results are compared between the case of FIG. 25 and a case where the display is enlarged in size to be doubled, by illustrating examples.

FIG. 26 is a diagram in which smoothing processing results are compared between the case of FIG. 25 and a case where the display is enlarged in size to be doubled, by illustrating examples. It is found that the edge amount input characteristically became smaller than that in the normal condition, i.e., than that before the enlargement. It is found that since all the data pieces were smoothed in this embodiment, the standard deviation was smaller and the image was smoother and had a higher quality than those of the conventional technique. In this case, the edge amount input became smaller than that before the enlargement, and all the pixels were smoothed in this example.

Figure 27:
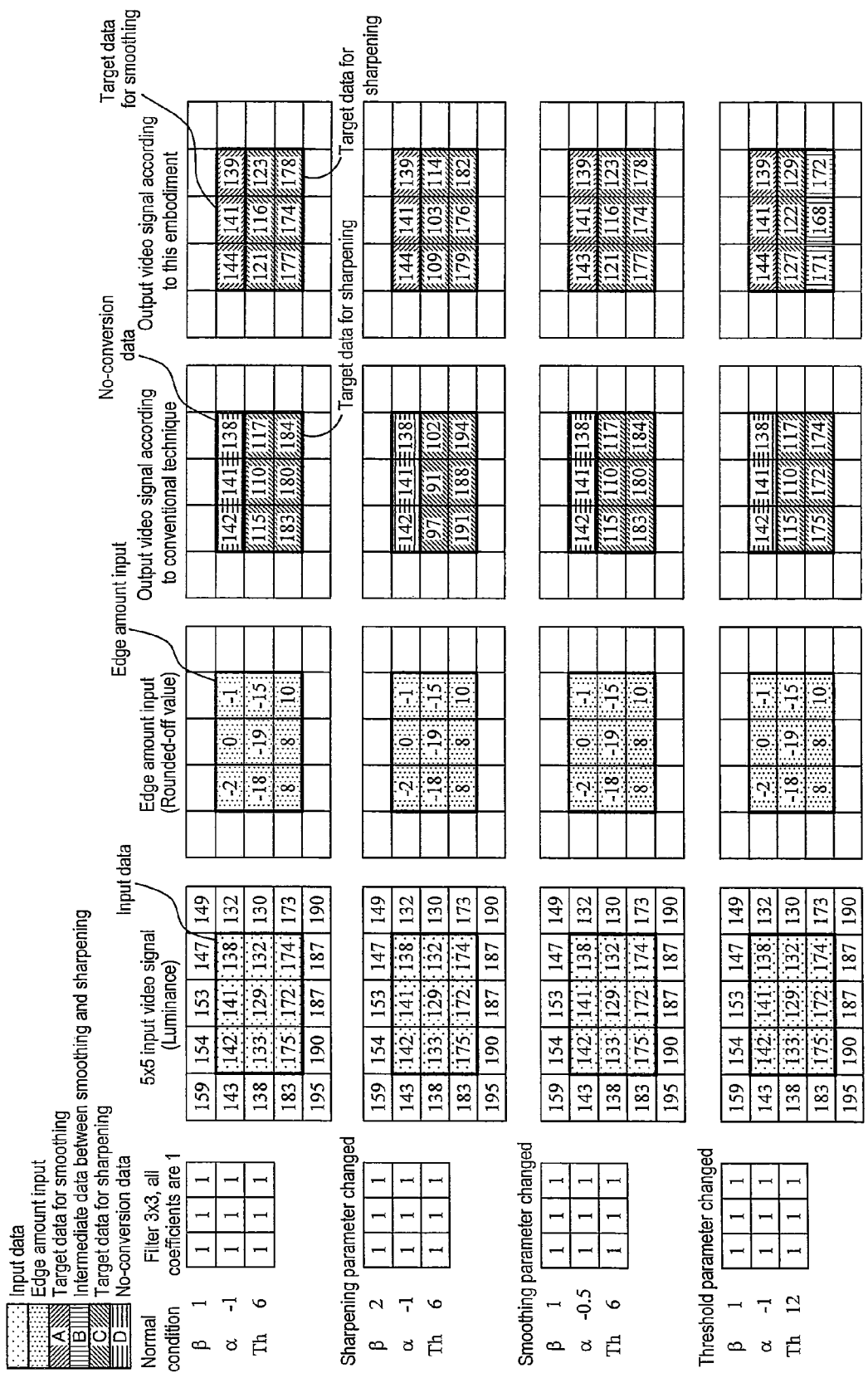
FIG. 27 is a diagram in which sharpening processing results are compared between the video image processing technique according to this embodiment and the conventional one, by illustrating examples.

FIG. 27 is a diagram in which sharpening processing results are compared between the video image processing technique according to this embodiment and the conventional technique, by illustrating examples, and is a drawing equivalent to FIG. 25. In order from the top, illustrated are examples of: a case where the parameters are set as $\beta=1$, $\alpha=-1$, and Th=6; a case where the parameters are set as $\beta=2$ (double), $\alpha=-1$, and Th=6; a case where the parameters are set as $\beta=1$, $\alpha=-0.5$ (half), and Th=6; and a case where the parameters are set as $\beta=1$, $\alpha=-1$, and Th=12 (double). In this embodiment, there are data pieces to be smoothed and data pieces to be sharpened. In addition, the switching between the sharpening processing and the smoothing processing is made continuously. For this reason, it is found that this embodiment provides an image which is smoother and of higher quality than that according to the conventional technique.

Figure 28:
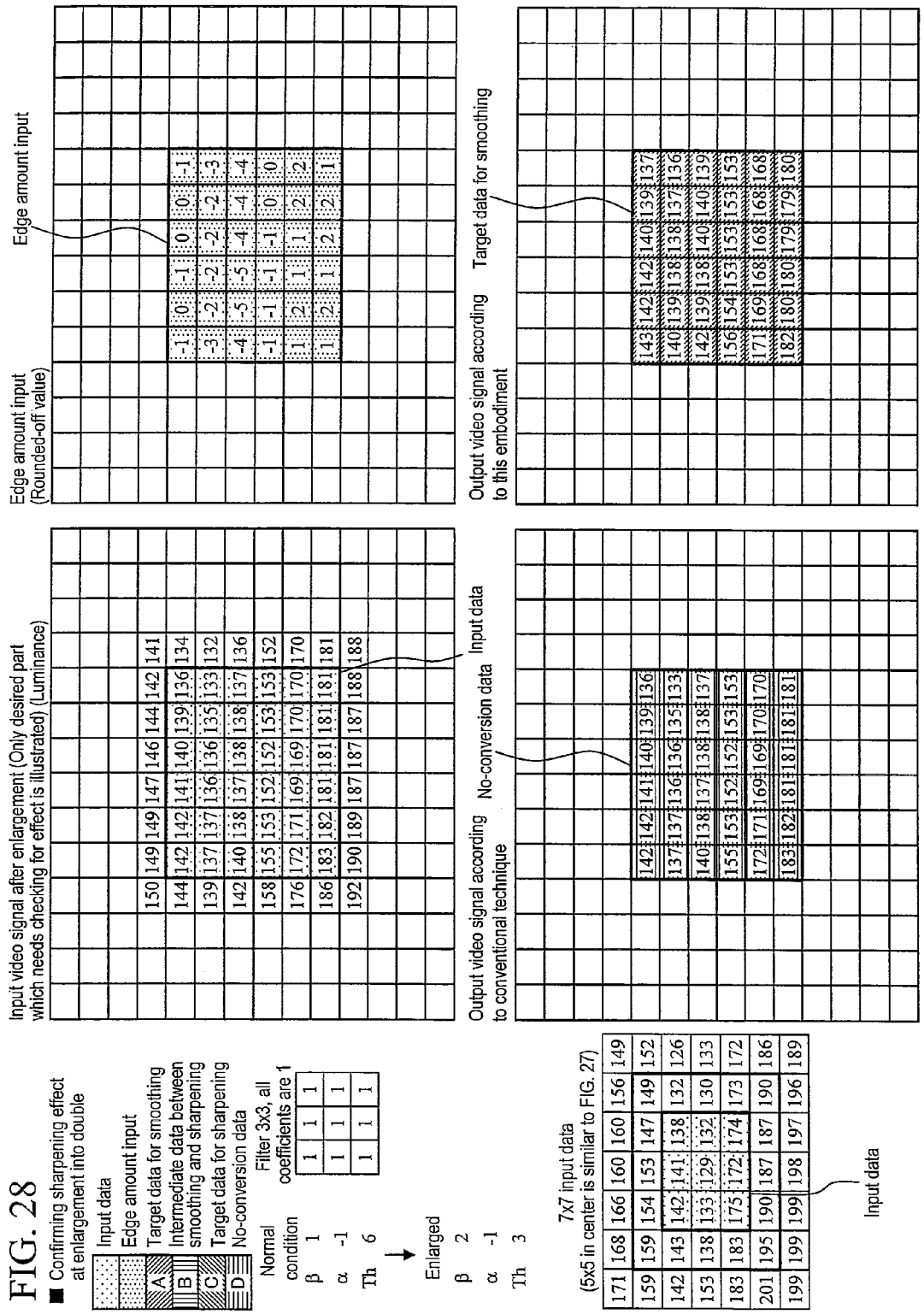
FIG. 28 is a diagram in which sharpening processing results are compared between the case of FIG. 27 and a case where the display is enlarged in size to be doubled, by illustrating examples.

FIG. 28 is a diagram in which smoothing processing results are compared between the case of FIG. 27 and a case where the display is enlarged in size to be doubled, by illustrating examples. Here, as in the normal condition, $\beta=1$, $\alpha=-1$, and Th=6 are used as the set values. In this case, it is found that although it was intended to perform the sharpening, all the data pieces were smoothed consequently since the edge amount input became smaller than that before the enlargement. Although it is intended at the enlargement to double size to perform the sharpening in the same way as in the normal condition, the same setting as that of the normal condition adversely leads to smoothing all the output results of this embodiment. As in the enlargement for confirming the smoothing effect shown in FIG. 26, depending on an enlargement algorithm, the use of the same parameters as those of the normal condition leads to a result where a quite a large number of pixels are smoothed at the enlargement since the edge amount input becomes smaller than that before the enlargement. When enlarged in size, an image has a higher quality by reducing the ratio of data to be smoothed and by increasing the ratio of data to be sharpened. For this reason, at least one of the following three operations is performed, and thereby a higher-quality image can be obtained. The three operations are: making the threshold Th smaller; making the parameter a to determine the smoothing amount smaller; and making the parameter β to indicate the sharpening amount larger. Thus, for example, the settings of β=2 (double), α=−1, and Th=3 (half) have to be made here at the enlargement. Additionally, an image can be adjusted according to the user's taste even though he/she has not checked what the enlargement algorithm in the previous step is like since the three parameters can be adjusted after seeing the output result.

Meanwhile, FIG. 29 is a diagram illustrating a result obtained after data of an image which was once enlarged in size in FIG. 28 and then reduced in size to be half was subjected to the smoothing and the sharpening processing, as an input video signal. Here, it is predictable that quite a large number of pixels would have been sharpened if the values of β=2, α=−1, and Th=3 which are proposed as the high quality parameters for the enlargement are similarly used as the set values. This is because the edge amount input becomes larger in comparison of that before the reduction in size (the edge amount input in FIG. 28). For this reason, for example, in order to obtain a high-quality image at the reduction to half size as in the case of the enlargement, the set values obtained by performing at least one of the following three operations at the reduction are set as the set values for the reduction and thereby a higher-quality image can be obtained. The three operations are: making the threshold Th larger; making the parameter α to determine the smoothing amount larger; and making the parameter β to indicate the sharpening amount smaller. The illustrated output video signals according to the conventional technique and according to this embodiment are the ones obtained when the processing was performed by using β=1 (half), α=−1, and Th=6 (double). With reference to the output result according to this embodiment, it is found that both the sharpening processing and the smoothing processing are made continuously and thus the higher-quality image can be obtained. An image can be adjusted according to the user's taste since the three parameters can be adjusted after seeing the output result even thought he/she has not checked what the reduction algorithm in the previous step is like.

(Conclusion)

According to this embodiment, it is possible to obtain a smooth high-quality video image since switching between data to be sharpened and data to be smoothed is always continuous in the X-Y input-output characteristics related to an edge amount input X and an edge amount output Y, the edge amount input X being a difference between an input video signal and an output signal obtained by processing the input video signal by use of a spacial filter, the edge amount output Y being obtained by converting the edge amount input X. Moreover, since a different output video signal can be obtained depending on any of the three parameters, a high-quality video image can be obtained even when the image is enlarged or reduced in size (e.g., portrait display or landscape display in TV broadcasting). In addition, since an adjustment can be made in accordance with properties (resolution, screen size, the number of bits in a video image) of a device which displays the video image, a high-quality video image can be obtained. Furthermore, it is possible to enhance the degree of freedom of the parameter adjustment.

It should be noted that, in the embodiments mentioned above, configurations and the like are not limited to those illustrated in the attached drawings but can be modified as appropriate within a scope in which the effects of the present invention are exerted. Other modifications can be made as appropriate without departing from the scope of the objects of the present invention. For example, consider a case where a description is given on a first function (Function 1) which passes the origin and performs smoothing processing on condition that 0<X<Th1 where X of an X-Y plane defined by an edge amount input X and an edge amount output Y is in a positive range. In this case, as far as the first function passes near the origin, the first function is regarded as being within the scope of the present invention even though the first function does not pass the origin in the strict sense. Also as to a second function (Function 2) which passes a point on the X axis where the threshold is set to an X value (Th1, 0) and performs smoothing processing on condition that 0<X<Th1 as well as which performs sharpening processing on condition that X>Th1, as far as the second function passes near the point (Th1, 0), the second function is regarded as being within the scope of the present invention even though the second function does not pass the point.

Specifically, the present invention is a video signal circuit which performs smoothing processing and sharpening processing on an input video signal to obtain an output video signal. The video signal circuit according to the present invention is characterized in that when an edge amount input (X) of the input video signal is to be converted to an edge amount output (Y), input-output characteristics of the video signal are determined by continuous functions each of which includes three factors and in each of which at least one of the three factors is set as a variable parameter, the three factors being a smoothing coefficient (α) for determining the strength of the smoothing processing, a sharpening coefficient (β) for determining the strength of the sharpening processing, and a threshold (Th) for determining a point (X) at which switching is made between the smoothing processing and the sharpening processing. The present invention can be modified, replaced, or subjected to other changes in various ways within a scope conceivable by those skilled in the art. Even in such a case, the modification, the replacement, and the like are regarded to be within the scope of the present invention.

Moreover, processing may be performed on each component by recording a program for achieving the functions described in the embodiments in a computer readable recording medium and by causing a computer system to read and execute the program recorded in the recording medium. In this respect, the "computer system" here includes hardware such as an OS and peripheral devices.

Moreover, the "computer system" includes a homepage providing environment (or display environment) provided that a WWW system is used.

Further, the "computer readable recording medium" denotes: a transportable medium such as a flexible disk, a magneto-optical disk, a ROM and a CD-ROM; or a storage device such as a hard disk incorporated in the computer system. Furthermore, the "computer readable recording medium" includes: a component which dynamically holds a program for a short time period like a communication line used in a case of transmitting a program via a network such as the Internet or a communication line such as a telephone line; and a component which dynamically holds the program for a certain time period, like a volatile memory inside the computer system serving as a server or a client in the aforementioned case. Moreover, the program may be the one for implementing a part of the functions described above or may be the one which is capable of implementing the above functions in combination with another program which has been recorded in the computer system in advance.

Industrial Applicability

The present invention is applicable to a video image processing circuit.

The invention claimed is:

1. A video signal circuit which performs smoothing processing and sharpening processing on an input video signal to obtain an output video signal, wherein
when an edge amount input (X) of the input video signal is to be converted to an edge amount output (Y), input-output characteristics of a video signal are determined by providing a first function (Function 1) and a second function (Function 2) and by setting at least one of three factors as a variable parameter, where
in a positive range of X of an X-Y plane defined by the edge amount input X and the edge amount output Y,
the first function passes an origin and performs smoothing processing on condition that 0<X<Th1 and
the second function passes a point (Th1, 0) on an X axis at which the threshold is set to a value of X and performs smoothing processing on condition that 0<X<Th1 and performs sharpening processing on condition that X>Th1, and
the three factors are
a smoothing coefficient (α1) for determining the strength of the smoothing processing,
a sharpening coefficient (β1) for determining the strength of the sharpening processing, and
the threshold (Th1) for determining switching between the smoothing processing and the sharpening processing.

2. A video signal apparatus which performs smoothing processing and sharpening processing on an input video signal to obtain an output video signal, the video signal apparatus comprising:
a conversion unit that, when an edge amount input (X) of the input video signal is to be converted to an edge amount output (Y), determines input-output characteristics of a video signal by providing a first function (Function 1) and a second function (Function 2) and by setting at least one of three factors as a variable parameter, where
in a positive range of X of an X-Y plane defined by the edge amount input X and the edge amount output Y,
the first function passes an origin and performs smoothing processing on condition that 0<X<Th1 and
the second function passes a point (Th1, 0) on an X axis at which the threshold is set to a value of X and performs smoothing processing on condition that 0<X<Th1 and performs sharpening processing on condition that X>Th1, and
the three factors are
a smoothing coefficient (α1) for determining the strength of the smoothing processing,
a sharpening coefficient (β1) for determining the strength of the sharpening processing, and
the threshold (Th1) for determining switching between the smoothing processing and the sharpening processing.

3. The video signal processing apparatus according to claim 2, wherein in the X-Y input-output characteristics, a larger one of the characteristics is selected in a case where the Function 1 and the Function 2 cross each other in a range of 0<X<Th1, while a smaller one of the characteristics is selected in a case where the Function 1 and the Function 2 cross each other in a range of Th2<X<0.

4. The video signal processing apparatus according to claim 2, wherein the Function 1 or the Function 2 is expressed by any one of equations of:

[Formula 1]
$\alpha$: a coefficient for determining the strength of smoothing processing
$\beta$: a coefficient for determining the strength of sharpening processing
$Th$: a threshold for determining switching between smoothing processing and sharpening processing
$$Y1 = \alpha \cdot X$$
$$Y2 = \beta \cdot (X - \text{Th\_t})$$
in the proviso that
$$\text{Th\_t} = \begin{cases} Th & (X \geq 0) \\ -Th & (X < 0), \end{cases}$$

[Formula 2]
$\alpha$: a coefficient for determining the strength of smoothing processing
$\beta$: a coefficient for determining the strength of sharpening processing
$Th$: a threshold for determining switching between smoothing processing and sharpening processing
$$Y1 = \alpha\_t \cdot X \cdot (X - \text{Th\_t})$$
$$Y2 = \beta \cdot (X - \text{Th\_t})$$
in the proviso that
$$\alpha\_t = \begin{cases} \alpha & (X \geq 0) \\ -\alpha & (X < 0) \end{cases}$$
$$\text{Th\_t} = \begin{cases} Th & (X \geq 0) \\ -Th & (X < 0), \text{ and} \end{cases}$$

[Formula 3]
$\alpha$: a coefficient for determining the strength of smoothing processing
$\beta$: a coefficient for determining the strength of sharpening processing
$Th$: a threshold for determining switching between smoothing processing and sharpening processing
$$Y1 = \alpha \cdot X \cdot (X - \text{Th\_t}) \cdot (X + \text{Th\_t})$$
$$Y2 = \beta \cdot (X - \text{Th\_t})$$
in the proviso that
$$\text{Th\_t} = \begin{cases} Th & (X \geq 0) \\ -Th & (X < 0). \end{cases}$$

5. The video signal processing apparatus according to claim 2, wherein when the input video signal is to be enlarged in size, at least one of a first operation, a second operation, and a third operation is executed, the first operation being one in which the threshold Th is changed to reduce the ratio of data to be smoothed and to increase the ratio of data to be sharpened, the second operation being one in which the smoothing coefficient α is changed to make the smoothing strength smaller, the third operation being one in which the sharpening coefficient β is changed to make the sharpening strength larger.

6. The video signal processing apparatus according to claim 2, wherein when the input video signal is to be reduced in size, at least one of a first operation, a second operation, and a third operation is executed, the first operation being one in which the threshold Th is changed to increase the ratio of data to be smoothed and to reduce the ratio of data to be sharpened, the second operation being one in which the smoothing coefficient α is changed to make the smoothing strength larger, the third operation being one in which the sharpening coefficient β is changed to make the sharpening strength smaller.

7. A display device, comprising:
a display unit which performs a display in accordance with the output video signal of the video signal processing apparatus according to claim 1.

8. A mobile terminal device, comprising:
the play device according to claim 7.

\* \* \* \* \*